United States Patent
Boudreau et al.

(10) Patent No.: US 10,644,832 B2
(45) Date of Patent: *May 5, 2020

(54) DEVICE-TO-DEVICE COMMUNICATION IN A MULTI-CELL NETWORK WITH PERFECT AND IMPERFECT CSI

(71) Applicant: Telefonaktiebolaget LM Ericsson (publ), Stockholm (SE)

(72) Inventors: Gary Boudreau, Kanata (CA); Min Dong, Whitby (CA); Ben Liang, Whitby (CA); Ali Ramezanikebrya, Toronto (CA); Hossein Seyedmehdi, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/072,994

(22) PCT Filed: Jun. 28, 2017

(86) PCT No.: PCT/IB2017/053886
§ 371 (c)(1),
(2) Date: Jul. 26, 2018

(87) PCT Pub. No.: WO2018/002854
PCT Pub. Date: Jan. 4, 2018

(65) Prior Publication Data
US 2019/0044648 A1 Feb. 7, 2019

Related U.S. Application Data

(60) Provisional application No. 62/355,607, filed on Jun. 28, 2016.

(51) Int. Cl.
*H04W 4/00* (2018.01)
*H04L 1/00* (2006.01)
(Continued)

(52) U.S. Cl.
CPC ......... *H04L 1/0026* (2013.01); *H04B 17/336* (2015.01); *H04L 1/0002* (2013.01);
(Continued)

(58) Field of Classification Search
CPC .... H04W 4/70; H04W 52/367; H04W 52/383
See application file for complete search history.

(56) References Cited

U.S. PATENT DOCUMENTS

2013/0294296 A1* 11/2013 Dimou ............... H04W 72/082
370/280
2016/0037322 A1* 2/2016 Nguyen ............... H04W 76/14
370/329
(Continued)

FOREIGN PATENT DOCUMENTS

WO 2016/142888 A1 9/2016

OTHER PUBLICATIONS

Ruhalla Alihemmati et al., Long-Term Power Allocation for Multi-Channel Device-to-Device Communication Based on Limited Feedback Information, Dept. of Electrical and Computer Engineering, University of Toronto, 2016, consisting of 5 pages.
(Continued)

*Primary Examiner* — Abdelnabi O Musa
(74) *Attorney, Agent, or Firm* — Sage Patent Group

(57) ABSTRACT

A method and network device for configuring a D2D pair and a cellular wireless device. The method includes receiving a subset of complete CSI parameters for the D2D pair, the cellular wireless device, and at least one neighbor interference level, determining feasibility conditions for pairing the D2D pair and the cellular wireless device transmissions based at least on the received subset of CSI parameters, determining a power allocation for the pairing of the D2D pair the cellular wireless device transmissions, the power allocation being based on a sum rate of the D2D pair
(Continued)

and cellular wireless device transmissions, and configuring the D2D pair and cellular wireless device based at least in part on the determined power allocation while limiting an inter-cell interference (ICI) generated in a plurality of neighboring cells. In one embodiment, the complete set of CSI parameters is received, rather than a subset.

20 Claims, 18 Drawing Sheets

(51) Int. Cl.
*H04W 52/38* (2009.01)
*H04W 76/14* (2018.01)
*H04B 17/336* (2015.01)
*H04W 4/70* (2018.01)
*H04W 52/36* (2009.01)

(52) U.S. Cl.
CPC ........... *H04W 4/70* (2018.02); *H04W 52/367* (2013.01); *H04W 52/383* (2013.01); *H04W 76/14* (2018.02)

(56) References Cited

U.S. PATENT DOCUMENTS

2016/0081046 A1* 3/2016 Li ................. H04W 72/082 370/328
2017/0289845 A1* 10/2017 Chiu ................. H04W 28/065

OTHER PUBLICATIONS

Ali Ramezani-Kebrya et al., Robust Optimization for Device-to-Device Communication in a Multi-Cell Network Under Partial CSI, Dept. of Electrical, Computer and Software Engineering, University of Ontario Institute of Technology, 2017, consisting of 6 pages.

Ali Ramezani-Kebrya et al., Optimal Power Allocation in Device-to-Device Communication With SIMO Uplink Beamforming, Dept. of Electrical and Computer Engineering, University of Toronto, 2015, consisting of 5 pages.

Huan Tang et al., Monotonic Optimization for Power Control of D2D Underlay With Partial CSI, Electrical and Computer Engineering Department, University of California, 2016, consisting of 6 pages.

Klaus Doppler et al., Device-to-Device Communication as an Underlay to LTE-Advanced Networks, IEEE Communications Magazine, Dec. 2009, consisting of 8 pages.

Daquan Feng et al., Device-to-Device Communications Underlaying Cellular Networks, IEEE Transactions on Communications, vol. 61 No. 8, Aug. 2013, consisting of 11 pages.

Gabor Fodor et al., Design Aspects of Network Assisted Device-to-Device Communications, IEEE Communications Magazine, Mar. 2012, consisting of 8 pages.

Hyunkee Min et al., Capacity Enhancement Using an Interference Limited Area for Device-to-Device Uplink Underlaying Cellular Networks, IEEE Transactions on Wireless Communications, vol. 10 No. 12, Dec. 2011, consisting of 6 pages.

International Search Report and Written Opinion of the International Searching Authority dated Oct. 19, 2017 and issued in corresponding PCT Application Serial No. PCT/IB2017/053886, consisting of 15 pages.

International Preliminary Report on Patentability dated Sep. 20, 2018 issued in corresponding PCT Application No. PCT/IB2017/053886 consisting of 24 pages.

* cited by examiner

DEVICE-TO-DEVICE COMMUNICATION IN A MULTI-CELL NETWORK WITH PERFECT AND IMPERFECT CSI

CROSS-REFERENCE TO RELATED APPLICATIONS

This application is a Submission Under 35 U.S.C. § 371 for U.S. National Stage Patent Application of International Application Number: PCT/IB2017/053886, filed Jun. 28, 2017 entitled "DEVICE-TO-DEVICE COMMUNICATION IN A MULTI-CELL NETWORK WITH PERFECT AND IMPERFECT CSI," which claims priority to U.S. Provisional Application No. 62/355,607, filed Jun. 28, 2016, entitled "DEVICE-TO-DEVICE COMMUNICATION IN A MULTI-CELL NETWORK WITH PERFECT AND IMPERFECT CSI," the entireties of both of which are incorporated herein by reference.

TECHNICAL FIELD

The present disclosure relates to device-to-device (D2D) communications and operation, network coverage, co-existence, radio emissions and interference mitigation, and in particular to optimizing the capacity of D2D underlays on legacy cellular networks with simultaneous D2D and legacy cellular wireless device transmissions.

Introduction

In order to achieve high data rates, several technologies including Evolved Universal Mobile Telecommunications System (UMTS) terrestrial radio access (EUTRA) and EUTRA network (EUTRAN) technologies have been defined in the Third Generation Partnership Project (3GPP) Long Term Evolution (LTE) set of wireless communication standards. Furthermore, local service requirements have led to the development of newer technologies such as LTE-Advanced.

In order to provide local services, one approach is to use license exempt spectrum of wireless local area networks (WLANs). Another approach is data transmission on a licensed band in a coordinated and planned network. Toward this second approach, device-to-device (D2D) communication has been studied extensively, where wireless devices in proximity to one another can transmit data directly to each other with reused cellular resource blocks. Due to its local communication nature, D2D communication can be provided with smaller fees compared to the fees for cellular communication. D2D communication provides many benefits that cannot be provided by uncoordinated communication.

Examples of advantages of using D2D communication are summarized as follows:
- The overall network spectral efficiency can be improved significantly with an optimal configuration.
- Low delay and low power consumption due to the proximity of wireless devices used for D2D communication.
- Improving radio resource utilization because of resource reuse by both cellular wireless devices and D2D pairs simultaneously.
- Using one link for direct communication, instead of one uplink and one downlink for communication through the base station, reduces resource usage.
- Offloading cellular traffic to D2D traffic reduces congestion in the backhaul network, benefiting existing cellular wireless devices in the network.

There are many current and prospective applications for D2D communications. For example, D2D has been used in LTE-based public safety networks in the United States for its security and reliability. In addition, D2D communication is useful in environments where cellular transmission is not available/accessible.

In commercial networks, many social network applications require recognition of nearby wireless devices. Proximity wireless device recognition is usually handled in a centralized manner, where wireless devices are required to register their location information in a server such that the location information can be shared among the other wireless devices, e.g., in FACEBOOK. With D2D, location registration is no longer required for the purpose of proximity discovery. Another prospective application for D2D communication is E-commerce, where nearby agencies need to transfer efficiently a large amount of private data.

One challenge of D2D communication is interference with and among the coexisting cellular wireless devices. For a D2D underlying cellular network, interference needs to be carefully controlled because cellular wireless devices and D2D pairs share the spectrum. In order to manage the interference to the cellular wireless devices in the same cell, several approaches have been proposed such as limiting D2D transmission power, employing a fixed booster factor and a back-off factor to adjust D2D power. An interference limited area has been proposed, where D2D pairs can share the resources of those cellular wireless devices located out of the area.

In practical multi-cell networks, inter-cell interference (ICI) is a challenge that has not been addressed in the D2D literature. The ICI depends on the duplexing scheme used by cellular wireless devices and D2D pairs and the resources blocks shared between D2D pairs and cellular wireless devices. The cellular wireless device and D2D pair powers should be set in an intelligent manner such that the ICI in the neighboring cell does not exceed some required upper limit. Furthermore, having perfect CSI knowledge at the base station is not realistic. In particular, D2D channels and ICI channels may not be perfectly available at the base station.

However, the existing solutions are not without problems. D2D communication could cause large ICI in the neighboring cells. There is currently no power allocation algorithm available limiting ICI caused by the wireless devices in the desired cell to wireless devices in multiple adjacent cells. In addition, the base station may not have perfect CSI knowledge in practical scenarios. There is no power allocation algorithm available in the literature for imperfect CSI scenario with ICI constraint in multiple neighboring cells. The term "perfect" CSI as used in this disclosure means that each of the CSI channel parameters are known. The term "imperfect" CSI as used in this disclosure means that only a subset of the CSI channel parameters are known, where a "subset" of CSI channel parameters means that less than all CSI channel parameters are known (or known only within a defined margin of error) and/or noisy estimated values of the CSI channel parameters, rather than exact values, are known.

Currently known algorithms are not designed to:
- Improve the sum rate of the wireless device and D2D pairs with a limit on the ICI generated in multiple neighboring cells with perfect CSI; or Improve the sum rate of the wireless device and D2D pairs with a limit on the ICI generated in multiple neighboring cells with imperfect CSI.

The D2D communication may be bi-directional communication where both devices receive and transmit in the same or different resources. However, the D2D communication scenario may also comprise that in which one of the devices transmits and the other one receives the signals. There may also exist a point-to-multipoint (e.g., multicast, broadcast) scenario in which case a plurality of devices receive signals from the same transmitting device. This scenario is particularly useful for emergency services or public safety operation to spread vital information to several devices in an affected area. The term D2D communication and D2D operation are interchangeably used throughout this disclosure.

Typically, devices operate under the supervision of the radio access network with radio access nodes (e.g., base station). But in some scenarios the devices themselves establish direct communication constituting the radio access network without the intervention of the network infrastructure.

In cellular network assisted device-to-device communications (or simply network assisted D2D communications), wireless devices in the vicinity of each other can establish a direct radio link (D2D bearer). While wireless devices communicate over the D2D "direct" bearer, they also maintain a cellular connection with their respective serving base station (eNB). This direct link is interchangeably called as network (NW) link, D2D-NW link, etc. The NW link is used, for example, for resource assignment for D2D communication, maintenance of radio link quality of D2D communication link, etc.

Three example coverage scenarios for D2D communication have been defined as follows.

In coverage—In this scenario all D2D wireless devices (WDs) communicating are under the network coverage. This means that the D2D WDs can receive signals from and/or transmit signals to at least one network node. In this case the D2D WD can maintain a communication link with the network. The network in turn can ensure that the D2D communication does not cause unnecessary interference. In coverage is also interchangeably called as in-network (IN) coverage.

Out of coverage—In this scenario D2D WDs communicating with each other are not under network node coverage. This means that the D2D WDs cannot receive signals from and/or transmit signals to any of the network nodes. Typically, the lack of coverage is due to the complete absence of the network coverage in the vicinity of the D2D WDs. However, the lack of coverage may also due to insufficient resources in the network nodes to serve or manage the D2D WDs. Therefore, in this scenario the network cannot provide any assistance to the devices. Out of coverage is also interchangeably referred to as out-of-network (OON) coverage.

Partial coverage—In this scenario at least one D2D WD communicating is under network coverage, and at least one UE communicating is not under network coverage. As mentioned above the D2D WD not being under the network coverage can be due to lack of any network node in its vicinity or due to insufficient resources in any of the network nodes in its vicinity. Partial coverage is also interchangeably referred to as partial-network (PN) coverage.

SUMMARY

The present disclosure advantageously provides a method and network device for determining, for both perfect and imperfect CSI scenarios, a power allocation for the pairing of a D2D pair and wireless device transmissions that improves the sum rate of the D2D pair and wireless device transmissions while limiting the ICI generated in a plurality of neighboring cells.

According to one aspect of the disclosure, in some embodiments, a method for configuring a device-to-device (D2D) pair and a cellular wireless device, the cellular wireless device configured to have a direct link with a serving network device of a network cell in which the cellular wireless device resides is provided. The method includes receiving a subset of complete Channel State Information (CSI) parameters for the D2D pair, the cellular wireless device, and at least one neighbor interference level, determining feasibility conditions for pairing the D2D pair and the cellular wireless device transmissions based at least on the received subset of CSI parameters, determining a power allocation for the pairing of the D2D pair and cellular wireless device transmissions, the power allocation being based on a sum rate of the D2D pair and cellular wireless device transmissions, and configuring the D2D pair and cellular wireless device based at least in part on the determined power allocation while limiting an inter-cell interference (ICI) generated in a plurality of neighboring cells.

According to other embodiments, the complete CSI parameters include a channel response between the D2D pair, a channel response between the cellular wireless device and the network device, an interference channel between a D2D transmitter and the network device, an interference channel between the cellular wireless device and a receiving device of the D2D pair, an inter-cell interference (ICI) channel between the D2D pair and a neighbor base station, and an ICI channel between the cellular wireless device and the neighbor base station.

According to other embodiments, the method further includes determining a plurality of beam vectors at the D2D pair and determining the power allocation for the pairing of the D2D pair and cellular wireless device transmissions based at least on the determined plurality of beam vectors. According to other embodiments, determining the power allocation for the pairing of the D2D pair and cellular wireless device transmissions includes determining a transmission power (Pc) for the cellular wireless device and a transmission power (Pd) for the D2D pair.

According to other embodiments, determining the feasibility conditions for pairing the D2D pair and the cellular wireless device transmissions includes determining whether a predetermined criteria are met when sharing the same Physical Resource Blocks (PRBs) between the cellular wireless device and the D2D pair. According to other embodiments, the predetermined criteria includes predefined Signal-to-Noise Ratio (SINR) thresholds for the D2D pair and the cellular wireless device, and at least one predefined ICI channel threshold.

According to another aspect, in some embodiments, a network device for configuring a D2D pair and a cellular wireless device, the cellular wireless device configured to have a direct link with a serving network device of a network cell in which the cellular wireless device resides is provided. The network device includes a receiver configured to receive a subset of complete CSI parameters for the D2D pair, the cellular wireless device, and at least one neighbor interference level, and processing circuitry including a memory and a processor, the memory in communication with the processor. The memory has instructions that, when executed by the processor, configure the processor to determine feasibility conditions for pairing the D2D pair and the cellular wireless device transmissions based at least on the received subset of CSI parameters, determine a power allocation for the pairing of the D2D pair and cellular wireless device transmissions, the power allocation being based on a sum rate of the D2D pair and cellular wireless device transmissions, and configure the D2D pair and cellular wireless device based at least in part on the determined power allocation while limiting an ICI generated in a plurality of neighboring cells.

According to some embodiments, the complete CSI parameters include a channel response between the D2D pair, a channel response between the cellular wireless device and the network device, an interference channel between a D2D transmitter and the network device, an interference channel between the cellular wireless device and a receiving device of the D2D pair, an ICI channel between the D2D pair and a neighbor base station, and an ICI channel between the cellular wireless device and the neighbor base station.

According to some embodiments, the processor is further configured to determine a plurality of beam vectors at the D2D pair and determine the power allocation for the pairing of the D2D pair and cellular wireless device transmissions based at least on the determined plurality of beam vectors. According to some embodiments, determining the power allocation for the pairing of the D2D pair and cellular wireless device transmissions includes determining a transmission power (Pc) for the cellular wireless device and a transmission power (Pd) for the D2D pair.

According to some embodiments, determining the feasibility conditions for pairing the D2D pair and the cellular wireless device transmissions includes determining whether a predetermined criteria are met when sharing the same PRBs between the cellular wireless device and the D2D pair. According to some embodiments, the predetermined criteria includes predefined SINR thresholds for the D2D pair and the cellular wireless device, and at least one predefined ICI channel threshold.

According to another aspect, in some embodiments, a method for configuring a D2D pair and a cellular wireless device, the cellular wireless device configured to have a direct link with a serving network device of a network cell in which the cellular wireless device resides, is provided. The method includes receiving complete CSI parameters for the D2D pair, the cellular wireless device, and at least one neighbor interference level, determining feasibility conditions for pairing the D2D pair and the cellular wireless device transmissions based at least on the received complete CSI parameters, determining a power allocation for the pairing of the D2D pair and cellular wireless device transmissions, the power allocation being based on a sum rate of the D2D pair and cellular wireless device transmissions, and configuring the D2D pair and cellular wireless device based at least in part on the determined power allocation while limiting the inter-cell interference (ICI) generated in a plurality of neighboring cells.

According to some embodiments, the complete CSI parameters include a channel response between the D2D pair, a channel response between the cellular wireless device and the network device, an interference channel between a D2D transmitter and the network device, an interference channel between the cellular wireless device and a receiving device of the D2D pair, an ICI channel between the D2D pair and a neighbor base station, and an ICI channel between the cellular wireless device and the neighbor base station.

According to some embodiments, the method further includes determining a plurality of beam vectors at the D2D pair and determining the power allocation for the pairing of the D2D pair and cellular wireless device transmissions based at least on the determined plurality of beam vectors. According to some embodiments, determining the power allocation for the pairing of the D2D pair and cellular wireless device transmissions includes determining a transmission power (Pc) for the cellular wireless device and a transmission power (Pd) for the D2D pair.

According to some embodiments, determining the feasibility conditions for pairing the D2D pair and the cellular wireless device transmissions includes determining whether a predetermined criteria are met when sharing the same PRBs between the cellular wireless device and the D2D pair. According to some embodiments, the predetermined criteria includes predefined SINR thresholds for the D2D pair and the cellular wireless device, and at least one predefined ICI channel threshold.

According to another aspect, in some embodiments, a network device for configuring a D2D pair and a cellular wireless device, the cellular wireless device configured to have a direct link with a serving network device of a network cell in which the cellular wireless device resides, is provided. The network device includes a receiver configured to receive complete CSI parameters for the D2D pair, the cellular wireless device, and at least one neighbor interference level, and processing circuitry that includes a memory and a processor, the memory in communication with the processor. The memory has instructions that, when executed by the processor, configure the processor to determine feasibility conditions for pairing the D2D pair and the cellular wireless device transmissions based at least on the received complete CSI parameters, determine a power allocation for the pairing of the D2D pair and cellular wireless device transmissions, the power allocation being based on a sum rate of the D2D pair and cellular wireless device transmissions, and configure the D2D pair and cellular wireless device based at least in part on the determined power allocation while limiting an inter-cell interference (ICI) generated in a plurality of neighboring cells.

According to some embodiments, the complete CSI parameters include a channel response between the D2D pair, a channel response between the cellular wireless device and the network device, an interference channel between a D2D transmitter and the network device, an interference channel between the cellular wireless device and a receiving device of the D2D pair, an inter-ICI channel between the D2D pair and a neighbor base station, and an ICI channel between the cellular wireless device and the neighbor base station.

According to some embodiments, the processor is further configured to determine a plurality of beam vectors at the D2D pair and determine the power allocation for the pairing of the D2D pair and cellular wireless device transmissions based at least on the determined plurality of beam vectors. According to some embodiments, determining the power allocation for the pairing of the D2D pair and cellular wireless device transmissions includes determining a transmission power (Pc) for the cellular wireless device and a transmission power (Pd) for the D2D pair.

According to some embodiments, determining the feasibility conditions for pairing the D2D pair and the cellular wireless device transmissions includes determining whether a predetermined criteria are met when sharing the same PRBs between the cellular wireless device and the D2D pair. According to some embodiments, the predetermined criteria includes predefined SINR thresholds for the D2D pair and the cellular wireless device, and at least one predefined ICI channel threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

The disclosure provides one or more embodiments for configuring D2D pairs and cellular wireless devices. One embodiment is described in the subsequent sections. A method to improve, as compared with known solutions, the throughput of a D2D pair and a legacy cellular or wireless access network (WAN) device sharing the same physical resource blocks (PRBs) within the same cell is described. Specifically, the method improves the sum rate with or without perfect CSI assumptions under power and multiple interference constraints, as well as defined quality of service (QoS) requirements, while limiting the ICI generated in a plurality of neighboring cells.

The disclosure provides embodiments that advantageously improve the sum rate or aggregate throughput of simultaneous transmission between D2D pairs and cellular wireless devices under the power and constraints of interference from multiple other cells, as well as QoS requirements, and considers the practical scenario of multiple neighboring cells with and without perfect CSI.

The disclosure also advantageously solves the non-convex power allocation problem and obtains the solution in closed form while outperforming the heuristic power allocation algorithms significantly in terms of sum rate and rate gain.

Figure 1:
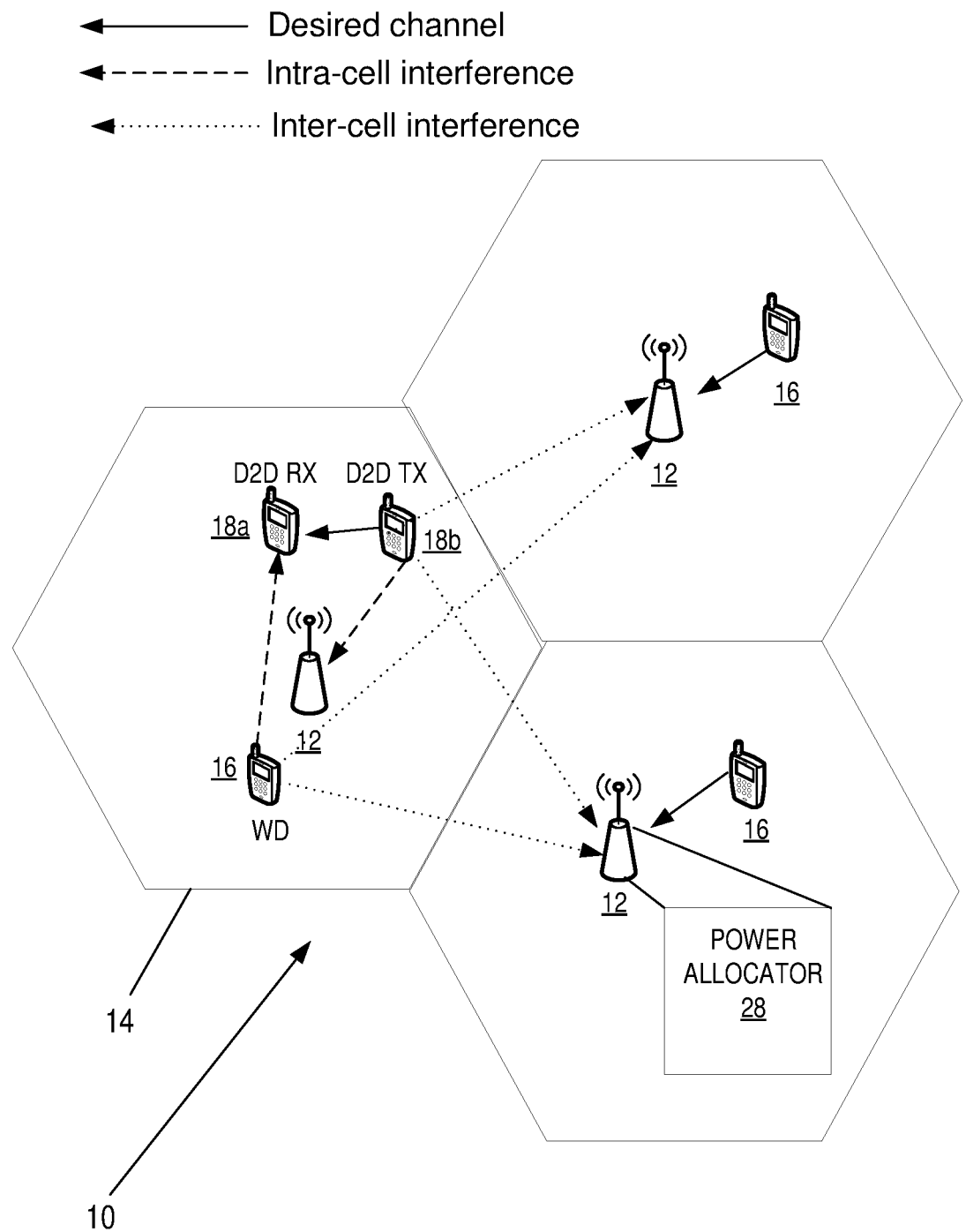
FIG. 1 is a diagram of a device-to-device pair and cellular wireless device serviced by a network node such as a base station in accordance with the principles of the disclosure.

The disclosure is applicable to a network device such as a multi-antenna base station which schedules one cellular wireless device and a D2D pair on the same PRBs as shown in FIG. 1. The powers of the WD and D2D transmitter can be determined such that the overall sum rate is improved (i.e., total or aggregate throughput) and the ICI caused in multiple neighboring cells is limited. In some embodiments, beamforming may be used in the base station to take advantage of the spatial diversity.

The term "network device" will be used herein to refer to a network node and/or a network capable wireless device. The network device herein can be the serving network node of the wireless device or any network node with which the wireless device can establish or maintain a communication link and/or receive information, e.g., via broadcast channel. For example, FIG. 1 depicts an exemplary communication wireless communication system 10 that includes a network device 12 such as a base station or evolved Node B (eNB), operating within a cell 14. Network device 12 serves one or more cellular wireless devices 16 within cell 14. Although only one network device 12 and one wireless device 16 are shown in cell 14 in FIG. 1, it is noted that more than two or more network devices 12 and two or more wireless devices 16 may be included in cell 14. FIG. 1 also shows wireless device 16 in communication with network device 12 and also in communication with a D2D wireless device 18a and 18b (referred herein as "D2D pair 18"). FIG. 1 also depicts neighboring cells having a network device 12 and corresponding wireless devices 16.

Herein, the term network device 12 and can be any kind of network node which may include a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., Mobile Management Entity (MME), Self-Organizing Network (SON) node, a coordinating node, positioning node, Minimization of Drive Tests (MDT) node, etc.), or even an external node (e.g., 3rd party node, a node external to the current network), wireless access point, etc. Note that herein a base station is but one example of a node. Implementations are not limited solely to base stations.

In embodiments of the present disclosure, the term "wireless device 16" may refer to any network capable device, for example, a wired network device such as wired a machine type communication (MTC) device, or a wireless device, such as a user equipment (UE). However, the nodes described herein need not be limited to a UE. The nodes may be any type of device that is configured or configurable for communication through wireless communication. Examples of such nodes are sensors, modems, smart phones, (MTC, or narrow band Internet of Things (NB IoT)) devices also known as machine to machine (M2M) devices, personal data assistants (PDAs), iPADs, Tablets, smart phones, laptop embedded equipped (LEE), laptop mounted equipment (LME), USB dongles, etc.

The disclosure includes embodiments which can be implemented in a network device and a network capable wireless device. The network device herein can be the serving network node of the wireless device or any network device with which the wireless device can establish or maintain a communication link and/or receive information (e.g., via a broadcast channel).

The embodiments also use a generic term "D2D pair 18." However, a D2D transmitting device and receiving device forming the D2D pair 18 can be any types of wireless device, which are capable of at least communication through wireless communication. Examples of such devices are sensors, modems, smart phones, machine type (MTC or NB IoT) devices (also known as machine to machine (M2M) device), PDA, iPAD, Tablet, laptop embedded equipped (LEE), laptop mounted equipment (LME), USB dongles etc.

Although terminology from 3GPP LTE (or E-UTRAN) is used in this disclosure, this should not be seen as limiting the scope of the disclosure to only the aforementioned system. Other wireless systems, including Wide Band Code Division Multiple Access (WCDMA), Universal Mobile Telecommunications System (UMTS) Terrestrial Radio Access (UTRA)-Frequency Division Duplexing (FDD), UTRA TDD, and Global System for Mobile Communications (GSM) Edge Radio Access Network (GERAN)/EDGE, may also benefit from exploiting the ideas covered within this disclosure.

The embodiments are described when D2D pairs 18 and cellular WDs 16 are configured to be served by or operate with a single carrier (i.e., single carrier operation of the WD 16) for communication or configured to use or operate a single carrier in a network device. However, the embodiments are also applicable for multi-carrier or carrier aggregation based communication.

Figure 2:
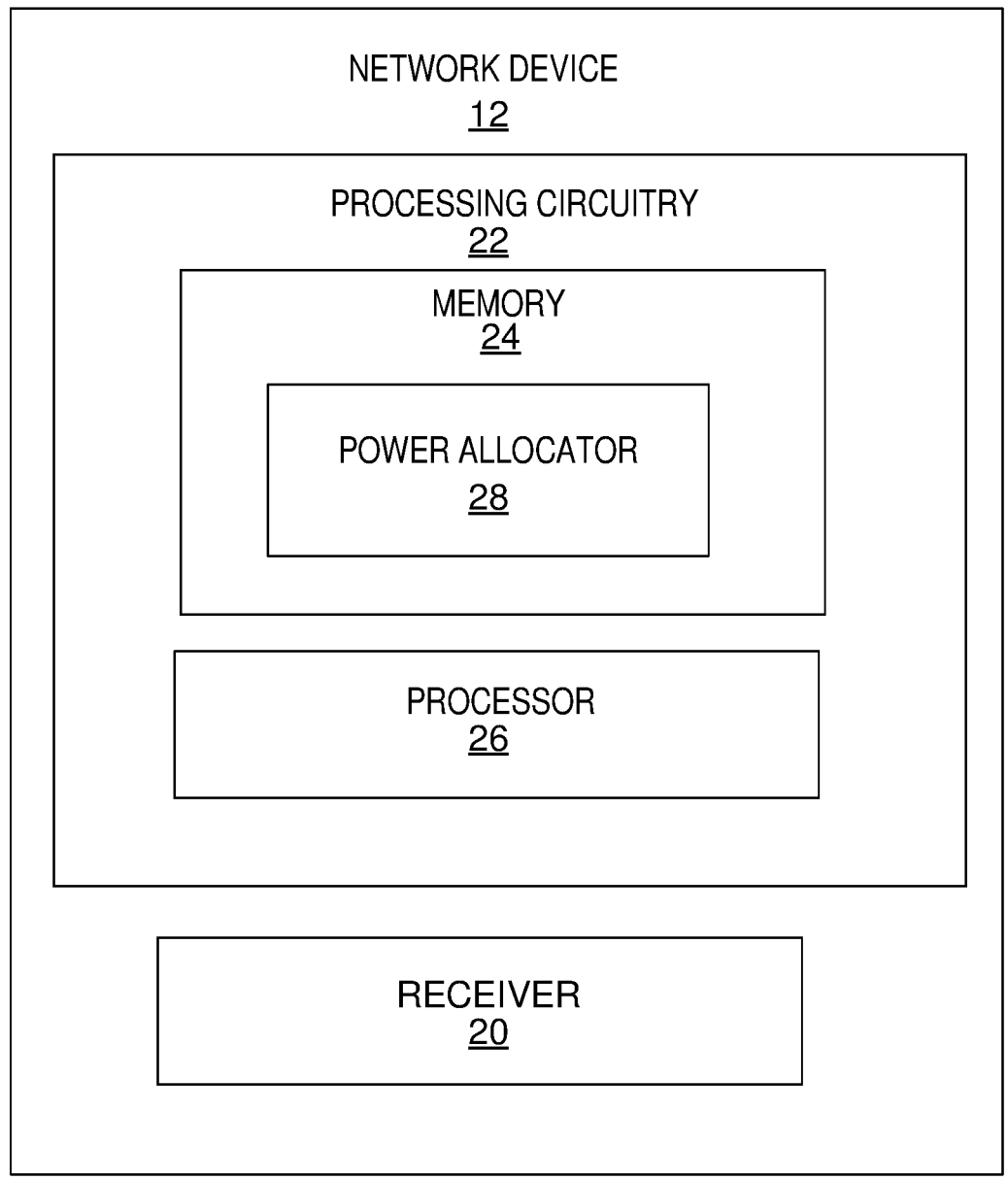
FIG. 2 is a block diagram of a network device for configuring a D2D pair and cellular wireless device in accordance with the principles of the disclosure.

FIG. 2 is a block diagram of network device 12 for configuring a D2D pair 18 and a cellular wireless device 16, the cellular wireless device 16 configured to have a direct link with a serving network device 12 of a network cell 14 in which the cellular wireless device 16 resides. Network device 12 includes a receiver 20 configured to receive a subset of complete Channel State Information (CSI) parameters for the D2D pair 18, cellular wireless device 16, and at least one neighbor interference level, and processing circuitry 22 that includes a memory 24 and a processor 26, the memory 24 in communication with the processor 26. Memory 26 includes instructions that, when executed by processor 26, configure processor 26 to determine feasibility conditions for pairing the D2D pair 18 and the cellular wireless device 16 transmissions based at least on the received subset of complete CSI parameters, determine a power allocation for the pairing of the D2D pair 18 and cellular wireless device 16 transmissions, the power allocation being based on a sum rate of the D2D pair 18 and cellular wireless device 16 transmissions, configure the D2D pair 18 and cellular wireless device 16 based at least in part on the determined power allocation while limiting an inter-cell interference (ICI) generated in a plurality of neighboring cells. The power allocation may be performed by processor 26, power allocator 28, or a combination of the two.

Figure 3:
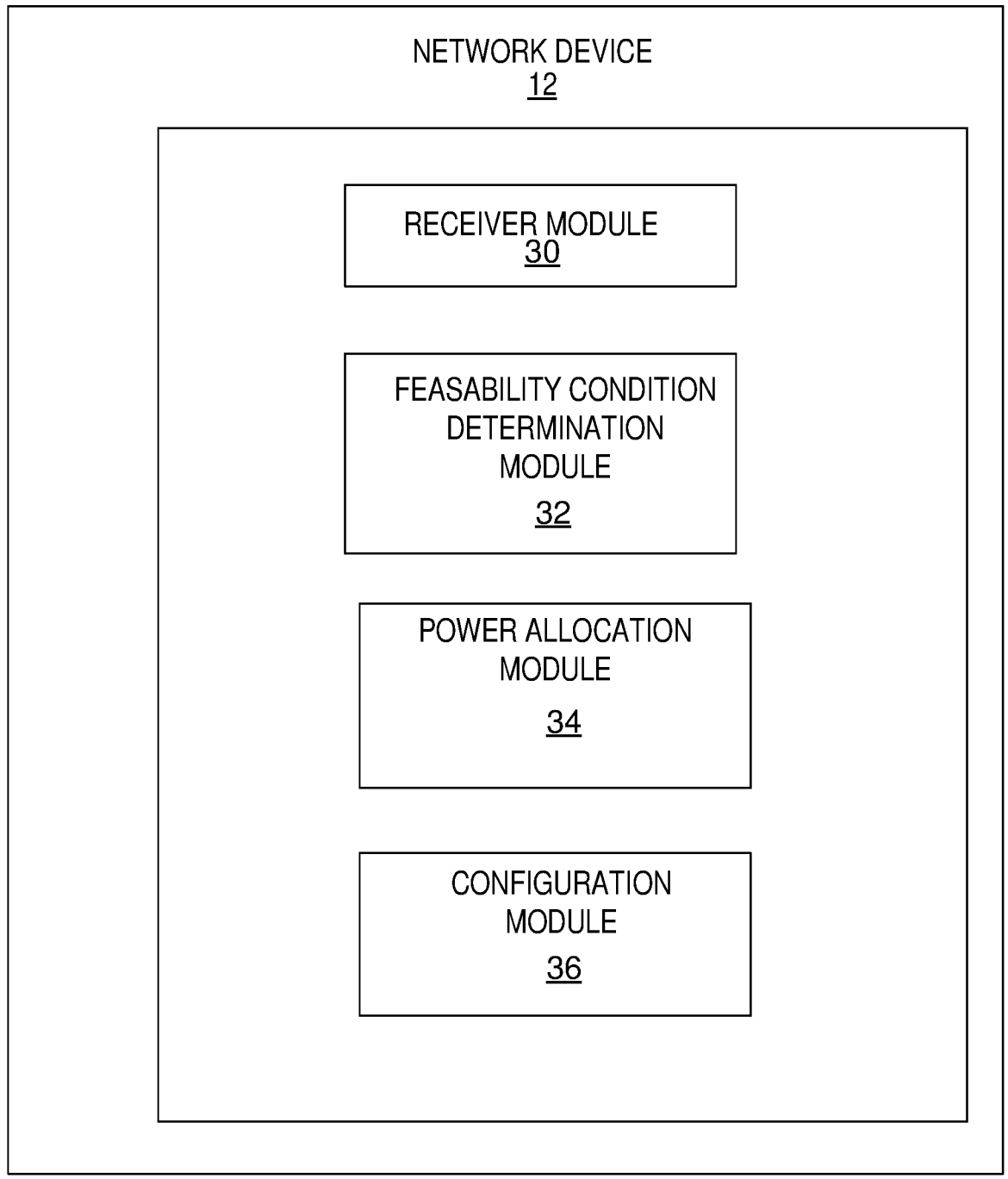
FIG. 3 is a block diagram of an alternate network device for configuring a D2D pair and cellular wireless device in accordance with the principles of the disclosure.

FIG. 3 is a block diagram of an alternate network device 12 for configuring a D2D pair 18 and cellular wireless device 16 in accordance with the principles of the disclosure. The network device 12 in FIG. 3 includes a receiver module 30 configured to receive a subset of complete CSI parameters for the D2D pair 18, the cellular wireless device 16, and at least one neighbor interference level. The network device 12 also includes a feasibility condition determination module 32 configured to determine feasibility conditions for pairing the D2D pair 18 and the cellular wireless device 16 transmissions based at least on the received subset of CSI parameters, and a power allocation module 34 configured to determine a power allocation for the pairing of the D2D pair 18 and cellular wireless device 16 transmissions, the power allocation module 34 being based on a sum rate of the D2D pair 18 and cellular wireless device 16 transmissions. The network device 12 also includes a configuration module 36 for configuring the D2D pair 18 and cellular wireless device 16 based at least in part on the determined power allocation while limiting an ICI generated in a plurality of neighboring cells.

The computation complexity of the sum rate algorithm described herein is low. The powers and beam weight are obtained essentially in closed-form. A fourth-order equation with closed-form solution is given. Then one pair of powers out of a few candidates is selected in order to improve the sum rate. The algorithm can be easily implemented in an eNB scheduler due to its simplicity. It is noted that although some of the algorithms described herein and graphs depicted in the figures are labeled with the term "maximum" or "maximization," the term "optimal" may also be used to describe these algorithms and graphs. The methods and arrangements described herein are to determine an optimal power allocation for the pairing of the D2D pair 18 and cellular wireless device 16 transmissions, while limiting the ICI generated in a plurality of neighboring cells. Thus, the terms "maximum" and "maximization" shall not necessarily be construed as "reaching a pinnacle" or attaining a highest amount.

Furthermore, the sum rate algorithm disclosed herein leads to a unique solution, i.e., the optimum powers and beam vectors optimized to help improve the sum rate. Hence, from an observability perspective if a competitor uses the same algorithm with the same constraints and objective, the same powers are obtained for similar channel information. This can be observed by measuring transmitter powers of the WD 16 and D2D pair 18, Signal-to-Interference-plus-Noise-Ratio (SINR) at the receivers, and ICI in the neighboring cells.

Embodiment #1: Device-to-Device Communication with Perfect CSI

The disclosure includes an embodiment which is described in the subsequent sections. More specifically, this embodiment of the disclosure includes the following steps:

Step 1: Obtain, by receiver 20 of network device 12, CSI data of the transmit channels for the candidate D2D pair 18, candidate cellular WD 16 and other cell eNB interference levels.

Step 2: Determine, by processor 26 of network device 12, feasibility conditions for pairing of D2D and cellular WD 16 transmissions.

Step 3: Solve, by processor 26 in conjunction with power allocator 28, the optimal power allocation for the D2D pair 18/WD 16 pairing.

The system parameter definitions and configuration under which the network and mobile nodes operate is summarized below.

Communicating Nodes and Beamforming

Furthermore, the following mobile and network node is assumed to be configured as follows:

Joint power optimization for one cellular WD 16 and one D2D pair 18;

b neighboring cells;

The WD 16, the D2D transmitter, and the D2D receiving device are each equipped with a single antenna;

The base station (BS) has N antennas;

Receive beamforming is supported at the BS; and w: is defined as the unit-norm receive beamforming vector associated with a WD 16.

Resource Sharing and Constraints

The following configuration is assumed to be supported with regard to Radio Resource Management (RRM) parameters:

Uplink resource sharing is supported;

Partial or full channel loading can be supported. For a fully loaded cell, all orthogonal channels are occupied;

Per-node power constraints are defined as P_C^max being the maximum power for the cellular WD 16 and P_D^max being the maximum power for the D2D pair 18;

$\sigma^2$ and $\sigma\_D^2$ are the noise power levels measured in the BS and the D2D receiving device respectively;

Both the cellular WD 16 and D2D pair 18 have their minimum QoS requirements defined in terms of the received SINR;

and $\tilde{\gamma}\_C$ and $\tilde{\gamma}\_D$ are the minimum SINRs guaranteed for the WD 16 and D2D pair 18 respectively; and $\tilde{I}$ is the constraint on the maximum ICI in the neighboring cell.

Step 1: Measured CSI Parameters

The channel state information (CSI) parameters are measured at the serving cell network node (i.e. eNB) 12, the D2D pair 18, the cellular mobile node 16 (i.e. cellular WD), or the neighboring cell network node as indicated.

CSI is measured for the following channels $h_D$, $h_C$, $g_D$, $g_C$, $f_{D,j}$, and $f_{C,j}$ as defined below. The relevant duration and periodicity of the measurements can be defined by the network as a parameter or determined by the network node 12 (i.e. eNB) scheduler as part of the measurement step of the disclosure.

Perfect CSI is available;

$h_D$, $h_C$, $g_D$, $g_C$, $\{f_{D,j}\}_{j=1}^b$, are $\{f_{C,j}\}_{j=1}^b$ the instantaneous channels.

$h_D \in X$ is the D2D channel.

$h_C \in X^{N \times 1}$ is the between the WD 16 and the BS.

$g_D \in X^{N \times 1}$ is the interference channel between the D2D transmitter and the BS.

$g_C \in X$ is the interference channel between the WD 16 and the D2D receiving device.

$f_{D,j} \in X^{N \times 1}$ is the ICI channel between the D2D transmitter and neighboring B j.

$f_{C,j} \in X^{N \times 1}$ is the ICI channel between the WD 16 and neighboring BD j.

In this disclosure it is assumed that the PRBs of cellular WDs 16 are shared with the D2D pair 18. The D2D pair 18 shares at most the resource assignment of one WD 16, i.e., each D2D pair 18 interferes with at most one WD 16 in its serving cell.

The SINR at the D2D receiving device is given by:

$$\gamma_D = \frac{P_D |h_D|^2}{\sigma_D^2 + P_C |g_C|^2}. \tag{1}$$

The uplink received SINR at the BS from the WD 16 is given by:

$$\gamma_C = \frac{P_C |w^H h_C|^2}{\sigma^2 + P_D |w^H g_D|^2}. \tag{2}$$

This disclosure assumes unit norm beamweights, i.e., $\|w\|^2 = 1$.

The transmissions of both the D2D pair 18 and the WD 16 cause ICI in b neighboring cells. This disclosure addresses ICI for uplink transmission at neighboring base stations and the algorithms herein can also be applied to limiting ICI in a scenario with downlink transmission in neighboring cells.

The worst-case inter-cell interference (ICI) received in neighboring BS j, denoted by $P_{I,j}$ is given by:

$$P_{I,j} = P_C \|f_{C,j}\|^2 + P_D \|f_{D,j}\|^2. \tag{3}$$

Note that the actual ICI is upper-bounded by (Equation 3) since $|w_I^H f| \le \|f\|$, where $w_I$ denotes the neighboring cell beamforming vector. Let $w_j$ denote the beam vector at neighboring BS j. Note that $w_j$ is typically unknown to the WD 16 and D2D pair 18 in the desired cell. Since $|w_j^H f_j| \le \|f_j\|$, $P_{I,j}$ in (Equation 3) is an upper bound of the instantaneous ICI. If $w_j$ is known, then $\|f_j\|$ can be replaced by $|w_j^H f_j|$ to limit the instantaneous ICI.

Problem Formulation

The sum rate maximization problem is given by:

$$\max_{(P_D, P_C, w)} (\log_2(1 + \gamma_C) + \log_2(1 + \gamma_D)) \tag{4}$$

$$\text{subject to } \gamma_C \ge \tilde{\gamma}_C, \tag{5}$$

$$\gamma_D \ge \tilde{\gamma}_D, \tag{6}$$

$$P_C \le P_C^{max}, P_D \le P_D^{max}, \tag{7}$$

$$P_C \|f_{C,j}\|^2 + P_D \|f_{D,j}\|^2 \le \tilde{I}, j = 1, \ldots, b. \tag{8}$$

The following parameters are employed in the method to improve the sum rate:

For notation simplicity in the proofs, $x \triangleq P_D$ and $y \triangleq P_C$ denote the D2D pair 18 and WD 16 transmit power, respectively.

$n_D$ denotes the number of columns in a matrix D.

$x^o \triangleq P_D^o$ and $y^o \triangleq P_C^o$ denote the optimal D2D pair 18 and WD 16 power, respectively.

$$\rho \triangleq \frac{|h_C^H g_D|}{\|h_C\| \|g_D\|}$$

is the correlation coefficient.

$c_{1,j} \triangleq \|f_{C,j}\|^2 / \tilde{I}$ and $c_{2,j} \triangleq \|f_{D,j}\|^2 / \tilde{I}$ for $j = 1, \ldots, b$.

$\alpha \triangleq \frac{\tilde{\gamma}_C \sigma^2}{\|h_C\|^2}$, $\beta \triangleq \frac{\tilde{\gamma}_D}{|h_D|^2}$, $K_1 \triangleq \rho^2$, $K_2 \triangleq \frac{\sigma^2}{\|g_D\|^2}$, and $K_3 \triangleq |g_C|^2$.

$x_l = \frac{\xi}{2(1-K_1)}$ and $y_l = \frac{\xi}{2(1-K_1)\beta K_3} - \frac{\sigma_D^2}{K_3}$, and $s_l = [x_l, y_l]^T$.

$\psi_1 \triangleq \frac{1 - K_1 - c_2 K_2 - \alpha c_1 + \sqrt{(K_1 + c_2 K_2 + \alpha c_1 - 1)^2 - 4c_2(1-K_1)K_2(\alpha c_1 - 1)}}{2c_2(1-K_1)}$ and $\psi_2 \triangleq \frac{\sigma_D^2 \beta + \beta K_3 / c_1}{1 + \beta K_3 c_2 / c_1}$.

$C_0 = \begin{bmatrix} 0 & 0 & P_D^{max} & P_D^{max} & 0 \\ 0 & P_C^{max} & P_C^{max} & 0 & 0 \end{bmatrix}$, $A_0 = \begin{bmatrix} 1 & 0 & 1 & 0 \\ 0 & 1 & 0 & 1 \\ 0 & P_C^{max} & P_D^{max} & 0 \end{bmatrix} \Delta_0 = \begin{bmatrix} -1 & 0 \\ 0 & -1 \\ 1 & 0 \\ 0 & 1 \end{bmatrix}, \delta_0 \begin{bmatrix} 0 \\ 0 \\ P_D^{max} \\ P_C^{max} \end{bmatrix}$.

For a matrix $M_{n \times n}$:

$M_{a:b, c:d} \triangleq \begin{bmatrix} M_{a,c} & \cdots & M_{a,d} \\ \vdots & \vdots & \vdots \\ M_{b,c} & \cdots & M_{b,d} \end{bmatrix}$, $M_{a:b,:} \triangleq M_{a:b, 1:n}$, $M_{:, c:d} \triangleq M_{1:n, c:d}$.

Proposed Algorithm for Solving (Equation 4)

The steps for solving the maximization problem (4) are summarized in Algorithm 1:

---

Algorithm 1:
Maximizing the objective of problem (4):

---

Input: $C_0$, $A_0$, $\Delta_0$, $\delta_0$, $\alpha$, $\beta$, $K_1$, $K_2$, $K_3$, $\{c_{1,j}\}_{j=1}^b$, $\{c_{2,j}\}_{j=1}^b$, $\sigma_D^2$, $P_C^{max}$, $P_D^{max}$
Output: The optimal WD 16 power $P_C^o$, the optimal D2D pair 18 power $P_D^o$, and $w^o$
1:    Set $\tilde{i} = 0$, $C = C_0$, $A = A_0$, $\Delta = \Delta_0$, and $\delta = \delta_0$.
2:    for $j = 1$: $b$ do
3:      for $i = 1$: $n_A$ do
4:        Compute $s = [\tilde{x}, \tilde{y}]^T$ where $\tilde{x} = \frac{A_{2,i} - c_{1,j} A_{3,i}}{c_{2,j} A_{2,i} - c_{1,j} A_{1,i}}$ and $\tilde{y} = \frac{c_{2,j} A_{3,i} - A_{1,i}}{c_{2,j_{2,i}} - c_{1,j} A_{1,i}}$.
5:        if $\Delta \cdot s^\circ \delta$ and $\tilde{i} == 0$ then
6:          Set $i_1 = i$, $\tilde{i} = 1$, and $s_1 = s$ where $s_1 \triangleq [x_1, y_1]^T$.
7:        elseif $\Delta \cdot s^\circ \delta$ and $\tilde{i} == 1$ then
8:          Set $i_2 = i$ and $s_2 = s$ where $s_2 \triangleq [x_2, y_2]^T$.
9:        endif
10:      endfor
11:      if $\tilde{i} > 0$ then
12:        Set $C_1 \triangleq C_{:, 1:i_1}$, $C_2 \triangleq C_{:, i_2+1:n_C}$, $A_1 \triangleq A_{:, 1:i_1}$, and $A_2 \triangleq A_{:, i_2:n_A}$.
13:        Update $C = [C_1, s_1, s_2, C_2]$, $A = [A_1, c, A_2]$ where $c \triangleq [c_{2,j}, c_{1,j}, 1]^T$.
14:        Update $\Delta = [\Delta^T, C_{1:2}^T]^T$ and $\delta = [\delta^T, 1]^T$
15:      endif
16:    end for
17:    Check the feasibility $\Delta \cdot s_f^\circ \delta$.
18:    Set $i_s = 2$ and $i_f = n_A - 1$.
19:    if $A_{1:2, i_s} == [0, 1]^T$ then
20:      Set $i_s = 3$, $T_{:,1} = [\beta(\sigma_D^2 + K_3 P_C^{max}), P_C^{max}]^T$, and $Q_{:,1} = \left[ K_2 \left( \frac{K_1}{1 - \alpha / P_C^{max}} - 1 \right)^{-1}, P_C^{max} \right]^T$
21:    elseif $A_{1:2, i_f} == [1, 0]^T$ then
22:      Set $i_f = n_A - 2$, $T_{:, n_A - 2} = \left[ P_D^{max}, \frac{P_D^{max} - \beta \sigma_D^2}{\beta K_3} \right]^T$, $Q_{:, n_A - 2} = \left[ P_D^{max}, \alpha \left( 1 - \frac{K_1}{1 + K_2 / P_D^{max}} \right)^{-1} \right]^T$.

23:    end if
24:    for $j = i_s : i_f$ do
25:      Set $T_{:, j-1} = \left[ \psi_2, \frac{1 - c_2 \psi_2}{c_1} \right]^T$ and $Q_{:, j-1} = \left[ \psi_1, \frac{1 - c_2 \psi_1}{c_1} \right]^T$ with $c_1 = A_{2,j}$ and $c_2 = A_{1,j}$.
26:    end for
27:    Find the indexes $j_1$ and $j_2$ such that $\Delta \cdot T_{:, j_1}^\circ \delta$ and $\Delta \cdot Q_{:, j_2}^\circ \delta$.
28:    Define $\tilde{C} = \{ T_{:, j_1}, C_{:, j_1+2: j_2+1}, Q_{:, j_2} \}$ and set $P^o = \tilde{C}$.
29:    for $k = 1 : n_{\tilde{C}} - 1$ do
30:      if $A_{1:2, k+j_1} == [1, 0]^T$ or $A_{1:2, k+j_1} == [0, 1]^T$ then return
31:      else -continued Algorithm 1:
Maximizing the objective of problem (4):

32:  Compute $z = \left[x_r, \dfrac{1-A_{1,k+j_1}x_r}{A_{2,k+j_1}}\right]^T$ where $x_r$ is the root of (36) with $\tilde{C}_{1,k} \leq x_r \leq \tilde{C}_{1,k+1}$ 33:  Update $P^o = P^o \cup \{z\}$
34:  end if
35:  end for
36:  Enumerate among candidate solution set $P^o$ to find the optimal solution.
37:  Obtain the optimal beam vector.

Approach to Solve the Sum-Rate Maximization, i.e., Improvement Over Known Solutions, Problem (4)

The non-linear, non-convex optimization problem (Equation 4) is solved by formulating and solving two sub-problems, namely:

Feasibility test to determine whether the D2D pair 18 can share the spectrum with the WD 16; and Optimum power allocation Step 2: The Feasibility Test In this section, the aim is to find the necessary and sufficient condition to determine whether the D2D pair 18 can be admitted. In order to allow the D2D pair 18 to share the WD 16 resource, the constraints (5)-(8) should be satisfied, i.e., $\exists \{P_C, P_D\}$ such that:

$$\max_{w} \gamma_C \geq \tilde{\gamma}_C, \qquad (9)$$

(6), (7), (8).

Since $H_C \triangleq h_C h_C^H$ and $\Lambda_D \triangleq \sigma^2 I + P_D g_D g_D^H$, the beamforming problem at the BS for a fixed set of powers $\{P_C, P_D\}$ can be written as:

$$\max_{w} \frac{P_C w^H H_C w}{w^H \Lambda_D w}. \qquad (10)$$

Since (Equation 10) has the generalized eigenvalue problem structure, the optimum beamforming vector is given by:

$$w^o = \Lambda_D^\dagger h_C. \qquad (11)$$

It can be shown that $\Lambda_D \succ 0$ and hence, the pseudo inverse becomes the matrix inversion and $w^o = \Lambda_D^{-1} h_C$. Using the matrix inversion lemma, it can be shown that:

$$\Lambda_D^{-1} = \frac{1}{\sigma^2}\left(I - \frac{P_D g_D g_D^H}{\sigma^2 + P_D \|g_D\|^2}\right). \qquad (12)$$

Substituting (Equation 11) into (Equation 2), the maximum SINR associated with the WD 16 is given by:

$$\max_{w} \gamma_C = P_C h_C^H \Lambda_D^{-1} h_C. \qquad (13)$$

It is denoted that the correlation coefficient of the desired WD 16 channel and the interference channel from the D2D transmitter to the BS is $$\rho = \frac{|h_C^H g_D|}{\|h_C\| \|g_D\|}.$$

Then, (Equation 13) becomes $$\max_{w} \gamma_C = \frac{P_C \|h_C\|^2}{\sigma^2}\left(1 - \frac{\rho^2}{1 + \frac{\sigma^2}{P_D \|g_D\|^2}}\right). \qquad (14)$$

After beamforming and substituting the optimal beam weights, the feasibility test problem involves finding $\{P_C, P_D\}$ such that:

$$\frac{P_C \|h_C\|^2}{\sigma^2}\left(1 - \frac{\rho^2}{1 + \frac{\sigma^2}{P_D \|g_D\|^2}}\right) \geq \tilde{\gamma}_C, \qquad (15)$$

(6), (7), (8).

The constraint (Equation 6) is characterized by a line on the $P_C$-$P_D$ plane. The constraint (Equation 15) is analyzed to obtain the necessary and sufficient conditions for the problem (Equation 4) to be feasible.

Proposition 1.

It is assumed that the constraints (Equation 15) and (Equation 6) are met with equality. Then there exists a set of powers $\{P_C, P_D\}$ satisfying these two equality constraints. For notation simplicity, D2D pair 18 and WD 16 are denoted by x and y in the following. For optimum D2D pair 18 and WD 16 power, the notations $P_D^o = x^o$ and $P_C^o = y^o$ are used. It is assumed that (Equation 15) is met with equality. This can be rewritten as:

$$y = \alpha \left(1 - \frac{K_1}{1 + K_2/x}\right)^{-1}, \qquad (16)$$

where $$\alpha \triangleq \frac{\tilde{\gamma}_C \sigma^2}{\|h_C\|^2}, \ K_1 \triangleq \rho^2 < 1, \text{ and } K_2 \triangleq \frac{\sigma^2}{\|g_D\|^2}.$$

It can be shows that:

$$\frac{dy}{dx} = \alpha K_1 K_2 \left(1 - \frac{K_1}{1 + K_2/x}\right)^{-2} (x + K_2)^{-2} > 0, \quad (17)$$

$$\frac{d^2y}{dx^2} = 2\alpha K_1 K_2 (K_1 - 1) \left(1 - \frac{K_1}{1 + K_2/x}\right)^{-3} (x + K_2)^{-3} < 0. \quad (18)$$

Hence, y is a concave strictly increasing function of x. The SINR constraint (Equation 6) can be expressed as:

$$\frac{x}{\sigma_D^2 + K_3 y} = \beta, \quad (19)$$

where $$\beta \triangleq \frac{\tilde{\gamma}_D}{|h_D|^2} \text{ and } K_3 \triangleq |g_C|^2.$$

D2D pair 18 and WD 16 power satisfies both (Equation 16) and (Equation 19) by $x_I$ and $y_I$, respectively. Solving the intersection of the line (Equation 19) and the curve (Equation 16) results in:

$$x_I = \frac{\xi}{2(1 - K_1)} \quad (20)$$

and $$y_I = \frac{\xi}{2(1 - K_1)\beta K_3} - \frac{\sigma_D^2}{K_3}, \quad (21)$$

where
$\xi = \beta(\alpha K_3 + \sigma_D^2(1 - K_1)) - K_2 +$
$\sqrt{(\beta(\alpha K_3 + \sigma_D^2(1 - K_1)) - K_2)^2 + 4(1 - K_1)\beta K_2(\alpha K_3 + \sigma_D^2)}$.

The necessary and sufficient condition for feasibility of D2D communication is given by:

$$0 < x_I \leq P_D^{max}, \quad (22)$$

$$0 < y_I \leq P_C^{max}, \quad (23)$$

and $$c_{1,j} y_I + c_{2,j} x_I \leq 1, j=1, \ldots, b \quad (24)$$

where $c_{1,j} \triangleq \|f_{C,j}\|^2/\tilde{I}$ and $c_{2,j} \triangleq \|f_{D,j}\|^2/\tilde{I}$. Note that if either (Equation 22) or (Equation 23) does not hold, the maximum D2D pair 18 or WD 16 power is not enough to meet both SINR targets. If (Equation 24) does not hold, the ICI constraint cannot be satisfied.

Step 3: The Optimal Power Allocation Problem

After substituting (Equation 11) into (Equation 2), the problem of improving the sum rate for a D2D pair 18 and a WD 16 becomes:

$$(P_D^o, P_C^o) = \arg\max_{(P_D, P_C)} (\log_2(1 + \gamma_C) + \log_2(1 + \gamma_D)), \quad (25)$$

subject to (5),(6),(7),(8).

The objective function (Equation 25) can be expressed as:

$$R(x, y) = \log_2\left(\left(1 + \frac{ax}{\sigma_D^2 + K_3 y}\right)\left(1 + y\left(1 - \frac{K_1 x}{K_2 + x}\right)b\right)\right), \quad (26)$$

where $a \triangleq |h_D|^2$ and $b \triangleq \|h_C\omega^2/\sigma^2$.

Lemma 1

The optimal power solution pair $(x^o, y^o)$ is at the vertical, horizontal, or tilted boundary of j of $A_{xy}$, given by $x = P_D^{max}$, $y = P_C^{max}$, or $c_{1,j} y + c_{2,j} x = 1$, respectively. It can be shown that for any given power pair $(x, y)$ in the interior of the admissible area and any $\zeta > 1$, there exists another power pair $(\zeta x, \zeta y)$ such that:

$$R(\zeta x, \zeta y) > R(x, y). \quad (27)$$

Since log is a strictly increasing function, the following is considered:

$$R(\zeta x, \zeta y) = \left(1 + \frac{ax}{\sigma_D^2/\zeta + K_3 y}\right)\left(1 + \zeta y\left(1 - \frac{K_1 x}{K_2/\zeta + x}\right)b\right). \quad (28)$$

It can be seen that $$1 + \frac{ax}{\sigma_D^2/\zeta + K_3 y} > 1 + \frac{ax}{\sigma_D^2 + K_3 y}.$$

The following is defined:

$$\Phi(\zeta) \triangleq \zeta by(1 - K_1 x(x + K_2/\zeta)^{-1}) \quad (29)$$

Then, $$\frac{d\Phi(\zeta)}{d\zeta} = by \frac{xK_2(1 - K_1) + \zeta x^2(1 - K_1) + K_2/\zeta(K_2/\zeta + x(1 - K_1))}{\zeta(x + K_2/\zeta)^2} > 0,$$

In the following, the objective (Equation 25) is analyzed, assuming the constraint (Equation 8) is not active at optimality. Then the scenario when (Equation 8) is active at optimality in Lemma 2 is considered. If the optimal power pair is on the boundary line segment, where at least one of the powers is the maximum $\{P_C^{max}, P_D^{max}\}$, i.e., (Equation 8) is not active, Lemma 1 shows that at least one power in the optimal pair $(P_C^o, P_D^o)$ will be the maximum allowable power at optimality. In the following, the behavior of $h(x) \triangleq R(x, P_C^{max})$ and $g(y) \triangleq R(P_D^{max}, y)$ are analyzed to find the optimal power allocation.

Proposition 2

If the boundaries of the feasible region $A_{xy}$ do not include $c_{1,j} y + c_{2,j} x = 1$ for $j = 1, \ldots, b$, then the optimal power pair $\{x^o, y^o\}$ for problem (Equation 25) is at one end point of the vertical or horizontal boundary line segment of $A_{xy}$. The function g(y) can be written as:

$$g(y) = \left(1 + \frac{\alpha_1}{\alpha_2 + y}\right)(1 + \alpha_3 y). \quad (30)$$

Taking the derivative of (Equation 30) results in:

$$\frac{dg}{dy} = \frac{\alpha_3 y^2 + 2\alpha_2 \alpha_3 y + \mu}{(\alpha_2 + y)^2}, \quad (31)$$

where $\mu=\alpha_3\alpha_2^2+\alpha_1(\alpha_2\alpha_3-1)$. Then either $$\frac{dg}{dy} > 0 \text{ or } \frac{dg}{dy} = 0 \qquad (5)$$

has a valid solution only if $\mu<0$. Supposing $\mu<0$ and taking the second derivative, the result is:

$$\frac{d^2g}{dy^2} = \frac{2\alpha_1(1-\alpha_2\alpha_3)}{(\alpha_2+y)^3} > 0, \qquad (32)$$

since $\mu<0$ implies $\alpha_1(1-\alpha_2\alpha_3)>0$. In other words, $R(P_D^{max}, P_C)$ is a convex function of $P_C$.

Now assume, $P_C^o=P_C^{max}$. Then $h(x)$ can be written as:

$$h(x) = (1+\beta_1 x)\left(1+\beta_2\left(1-\frac{K_1}{K_2/x+1}\right)\right). \qquad (33)$$

taking the derivative of (33) results in:

$$\frac{dh}{dx} = \frac{\beta_1(1+\beta_2(1-K_1))x^2 + 2\beta_1 K_2(1+\beta_2(1-K_1))x + \omega}{(x+K_2)^2}, \qquad (34)$$

where $\omega=\beta_1 K_2^2+\beta_1\beta_2 K_2^2-\beta_2 K_1 K_2$. Note that $$\frac{dh}{dx} = 0$$

has a valid solution only if $\omega<0$. If $\omega<0$, then the second derivative of (33) becomes:

$$\frac{d^2h}{dx^2} = \frac{2\beta_1 K_2(1+\beta_2(1-K_1))K_2 + 2(\beta_2 K_1 K_2 - \beta_1 K_2^2 - \beta_1\beta_2 K_2^2)}{(x+K_2)^3} > 0. \qquad (35)$$

Hence $R(P_D, P_C^{max})$ is a convex function of $P_D$.

It can be seen from Lemma 1 that the optimal power, if exists, is not in the interior of the feasible region. The optimal power can be found if it is one of the corners of rectangle on power plane due to maximum power constraints. In the following, the scenario that the optimum power pair is on the tilted line due to ICI constraint in neighboring BS j, i.e., $c_{1,j}y+c_{2,j}x=1$ is considered.

Lemma 2

If the boundaries of the feasible region $A_{xy}$ include $c_{1,j}y+c_{2,j}x=1$ for some j, then the optimal power pair $(x^o,y^o)$ is given in one of the two cases: 1) An end point of the horizontal, vertical, or tilted boundary line segment(s) of $A_{xy}$; or 2) an interior point of tilted boundary line segment(s) of $A_{xy}$, whose x-coordinate for $c_{1,j}y+c_{2,j}x=1$ is one of the roots of the following quadratic equation:

$$e_4 x^4+e_3 x^3+e_2 x^2+e_1 x+e_0=0, \qquad (36)$$

where:

$e_0=aa_1 K_2^2(b_1+1)-a_1^2 b_1 K_1 K_2-a_1^2 b_2 K_2^2$ $e_1=-2aa_1 b_2 b_2 K_2^2+aa_1 K_2(b_1+1)+aa_1 K_2-2aa_1 K_1 K_2 b_1+$
$aa_1 b_1 K_2+2a_1^2 b_2 K_2(K_1-1)+2a_1 b_1 K_1 K_2 K_4+$
$2a_1 b_2 K_2^2 K_4$ $e_2=aa_1 b_2 K_2(3K_1-4)+aa_1(1+b_1(1-K_1))-a_1^2 b_2(1-K_1)+$
$b_2 K_2^2 K_4(a-K_4)+b_1 K_1 K_2 K_4(a-K_4)-4a_1 b_2 K_2 K_4$
$(K_1-1)$ $e_3=-2aa_1 b_2(1-K_1)+2a_1 K_4 b_2(1-K_1)-2b_2 K_2 K_4(K_1-1)$
$(a-K_4)$ $e_4=K_4(a-K_4)b_2(1-K_1)$, and $a_1 \triangleq \sigma_D 2^2+K_3/c_{1,j}$, $K_4 \triangleq K_3 c_{2,j}/c_{1,j}$, $b_1 \triangleq b/c_{1,j}$, and $b_2 \triangleq bc_{2,j}/c_{1,j}$.

The WD 16 power associated with the root $x^o$ is given by $$y^o = \frac{1-c_{2,j}x^o}{c_{1,j}}.$$

The optimum power on the line due to ICI is the solution of the following optimization problem:

$$\max_{(x,y)}\left(1+\frac{ax}{\sigma_D^2+K_3 y}\right)\left(1+y\left(1-\frac{K_1 x}{K_2+x}\right)b\right) \qquad (37)$$

subject to $c_{1,j}y+c_{2,j}x=1$. $\qquad (38)$

Substituting $$y = \frac{1-c_{2,j}x}{c_{1,j}}$$

into (37), the optimization problem becomes:

$$\max_x R(x), \qquad (39)$$

where $$R(x) \triangleq \left(1+\frac{ax}{a_1-K_4 x}\right)\left(1+(b_1-b_2 x)\left(1-\frac{K_1 x}{K_2+x}\right)\right).$$

Since $R(x)$ is continuous and has the first order derivative, the optimum x is obtained by solving $$\frac{dR(x)}{dx} = 0.$$

Computing the derivative and after some algebraic manipulations, $$\frac{dR(x)}{dx} = 0$$

can be recast as (Equation 36), which completes the proof.

In the following sections, the set of end points in the admissibility region are determined. An iterative algorithm is found by analyzing the feasible region when a new tilted line is added (a new active BS is considered in a neighboring cell). Two matrices can be defined: C which includes the end points of the feasible region due to constraints (Equation 7) and (Equation 8), i.e., without considering minimum SINR requirements for both the D2D pair 18 and WD 16; and A which specifies the line segment connecting any two consecutive end points in C. In particular, C is initially set to $C_0$ when we just constraint (Equation 7) is considered. The first and last columns of $C_0$ are $[0,0]^T$, i.e. the origin coordinates. The other end points in $C_0$ are set in a clock-wise order. The column $A_{:,i}$ is $[A_{i1}, A_{i2}, A_{i3}]^T$ when the line segment between $C_{:,i}$ and $C_{:,i+1}$ is $A_{i1}x + A_{i2}y = A_{i3}$.

Figure 4:
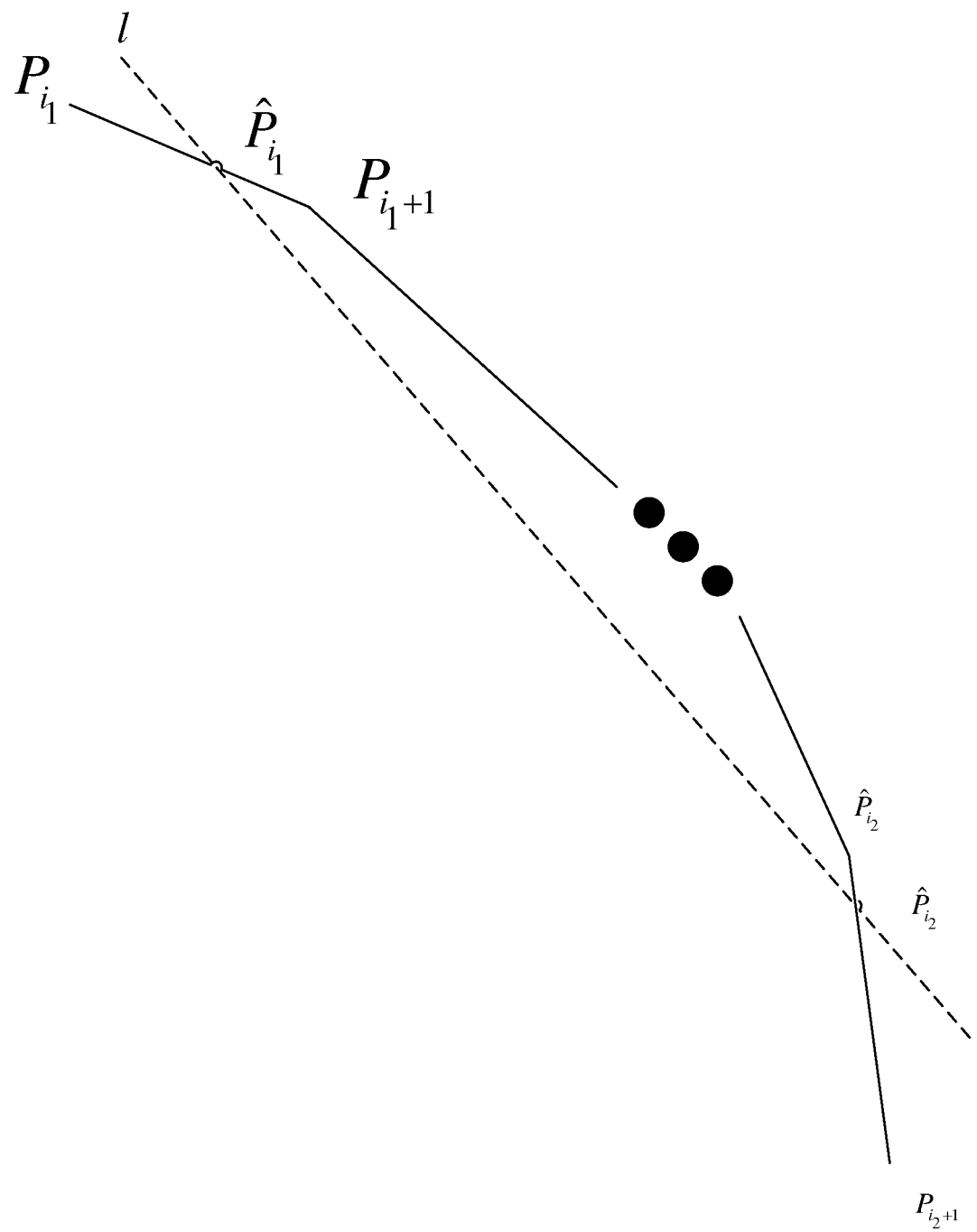
FIG. 4 is a diagram illustrating a solution to the optimization problem for Embodiment 1 in accordance with the principles of the disclosure.

Let $A_{xy,j}$ denote the feasible region after considering ICI constraint j considering constraints (Equation 7) and (Equation 8) as shown in FIG. 4. Then a new tilted line l is considered due to ICI constraint j+1. Note that l intersects $A_{xy,j}$ in exactly two points if there is any intersection. Then, $\{P_{i_1}, P_{i_1+1}, \ldots, P_{i_2}, P_{i_2+1}\} \subset A_{xy,j}$ is denoted as a set of end points in $A_{xy,j}$ such that the intersection of l with $A_{xy,j}$ are on the lines specified by $A_{:,i_1}$ and $A_{:,i_2}$. Since $\hat{P}_{i_1}$ and $\hat{P}_{i_2}$ are the end points of the new feasible region $A_{xy,j+1}$, C is updated by keeping the end points $\{P_{i_1}, P_{i_2+1}\}$ and removing $\{P_{i_1+1}, \ldots, P_{i_2}\}$, i.e., all the middle points. The new feasible region $A_{xy,j+1}$ includes $\{P_{i_1}, \hat{P}_{i_1}, \hat{P}_{i_2}, P_{i_2+1}\}$. Accordingly, the matrices C and A are updated.

Figure 5:
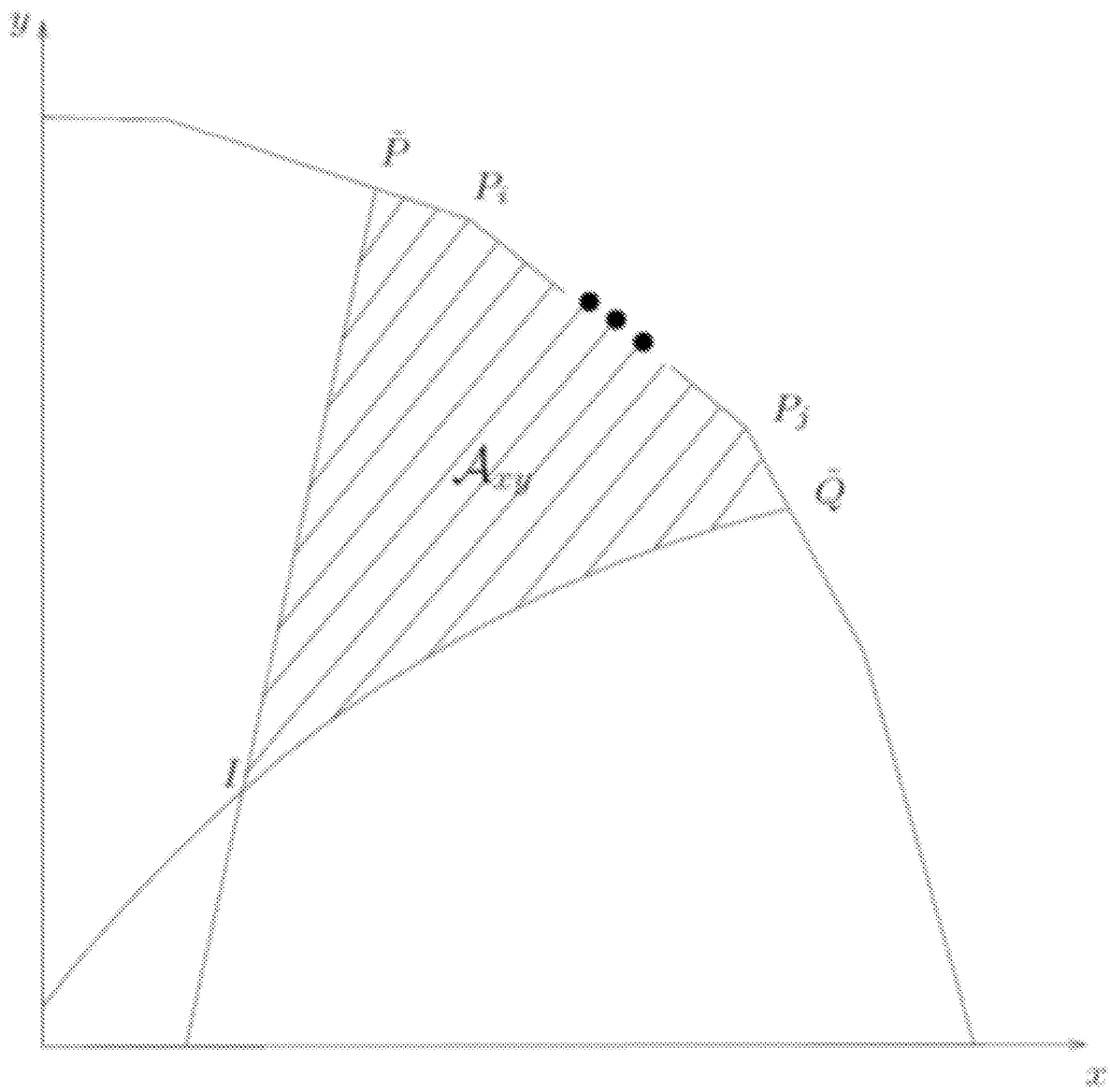
FIG. 5 is a diagram showing the feasibility region for solving the optimal power allocation problem for Embodiment 1 after considering the constraints shown in FIG. 4.

In order to test the admissibility of the D2D pair 18 and obtain the optimal power for the D2D pair 18 and WD 16, the intersection of $A_{xy,b}$ is considered with the curve and line associated with minimum SINR requirements (Equation 5) and (Equation 6) with equality for the WD 16 and D2D pair 18, respectively. The necessary and sufficient condition for the D2D pair 18 to be admissible is that the solution $s_I \triangleq [x_I, y_I]^T$ (Equation 20) that satisfies:

$$\Delta \cdot s_I \circ \delta \quad (40)$$

where $\Delta$ and $\delta$ are obtained through Algorithm 1. Let $\tilde{P}$ and $\tilde{Q}$ denote the points where the line I–$\tilde{P}$ and curve I–$\tilde{Q}$ intersect $A_{xy,b}$ as shown in FIG. 5. The feasible region is specified as the shaded area in FIG. 5. The feasible region may include some of tilted, horizontal, or vertical boundary line segments.

In order to solve problem (Equation 25), all candidates must be found to be optimal power. By Lemma 1 and Proposition 2, the optimal power pair $(x^o, y^o)$ can be one of Points $\{\tilde{P}, P_i, \ldots, P_j, \tilde{Q}\}$. In Algorithm 1, C denotes the set of all feasible corner points. Then all the roots of (Equation 36) are found whose x-coordinates are within the range of two consecutive corner points of C. Let $S_j$ denote the set of roots that meet the range constraint for $c_{1,j}y + c_{2,j}x = 1$. The set of candidate points on the interior of line segment $c_{1,j}y + c_{2,j}x = 1$ is given by $Z_j \triangleq \{(x, (1-c_{2,j}x)/c_{1,j}) : x \in S_j\}$. The set of candidate pairs $(x^o, y^o)$ for given by $P^o = C \cup_{j=1}^b Z_j$.

Embodiment #2: Optimal Power Allocation with Imperfect CSI

Embodiment #2 includes the following steps:

Step 1: Obtain, by receiver 20 of network node 12, imperfect CSI data of the transmit channels for the candidate D2D pair 18, candidate cellular WD 16 and other cell eNB interference levels.

Step 2: Determine, by processor 26 of network node 12, feasibility conditions for pairing of D2D pair 18 and cellular WD 16 transmissions.

Step 3: Solve, by processor 26 in conjunction with power allocator 28, the optimal power allocation for the D2D pair 18/WD 16 pairing.

Step 1: Measured CSI Parameters

Perfect CSI may be available only for $\{h_C, g_D\}$, i.e., the direct channels from the WD 16 and D2D pair 18 to the BS in FIG. 1.

Partial information is available for $h_D$, $g_C$, $\{f_{D,j}\}_{j=1}^b$, and $\{f_{C,j}\}_{j=1}^b$ (only distance-based statistical knowledge).

$|h_D|^2: \exp(\eta_1)$ and $|g_C|^2: \exp(\eta_2)$.

$E[\|f_{D,j}\|^2] = \lambda_{D,j}$ and $E[\|f_{C,j}\|^2] = \lambda_{C,j}$.

Based on the above assumptions, D2D pair 18 SINR and ICI at each neighboring BS are random variables. Due to only partial CSI knowledge, the SINR constraint (Equation 6) is replaced with a probabilistic constraint limiting the outage probability of D2D pair 18 SINR. The ICI constraint (Equation 8) is also replaced with an expected constraint.

Problem Formulation

The expected sum rate maximization problem with imperfect CSI is given by:

$$P1: \max_{(P_D, P_C, w)} (\log_2(1+\gamma_C) + E[\log_2(1+\gamma_D)])$$

subject to $Pr\{\gamma_D \leq \tilde{\gamma}_D\} \leq \varepsilon,$ (41)

$E[P_{I,j}] \leq \tilde{I}, j=1, \ldots, b$ (42)

(5) and (7)

where $\varepsilon$ is the limit on the outage probability of the D2D pair 18 SINR. The optimal beam vector is given by (Equation 11).

Due to some challenges involved in solving P1, an objective of P1 with $\log_2(1+\gamma_C) + \log_2(1+\bar{\gamma}_D)]$ is approximated where $\bar{\gamma}_D$ is obtained by the ratio of the expectation of the numerator to the expectation of the denominator of $\gamma_D$, i.e., in order to solve:

$$\max_{(P_D, P_C, w)} (\log_2(1+\gamma_C) + \log_2(1+\bar{\gamma}_D)) \quad (43)$$

subject to (5), (7), (41) and (42).

Analysis and simulations show that there is negligible performance degradation due to approximating the objective of P1.

The following parameters are employed in the proposed method to improve the sum rate, i.e., improve the sum rate over known solutions:

$\tilde{c}_{1,j} \triangleq \lambda_{C,j}/\tilde{I}$ and $\tilde{c}_{2,j} \triangleq \lambda_{D,j}/\tilde{I}$ for $j = 1, \ldots, b$.

$\alpha \triangleq \frac{\tilde{\gamma}_C \sigma^2}{\|h_C\|^2}$, $K_1 \triangleq \rho^2$, $K_2 \triangleq \frac{\sigma^2}{\|g_D\|^2}$, $a \triangleq 1/\eta_1$, $K_3 \triangleq 1/\eta_2$, $l_1 = \frac{\eta_2}{\eta_1 \tilde{\gamma}_D}$, $l_2 = \eta_1 \sigma_D^2 \tilde{\gamma}_D$.

$y_I = \alpha\left(1 - \frac{K_1}{1 + K_2/x_I}\right)^{-1}$, $y_I = l_1 x_I \left(\frac{\exp(-l_2/x_I)}{1-\varepsilon} - 1\right)$, and $s_I = [x_I, y_I]^T$.

$l_1 x_H \left(\frac{\exp(-l_2/x_H)}{1-\varepsilon} - 1\right) = P_C^{max}$.

$$\psi_1 \triangleq \frac{1 - K_1 - \tilde{c}_2 K_2 - \alpha\tilde{c}_1 + \sqrt{(K_1 + \tilde{c}_2 K_2 + \alpha\tilde{c}_1 - 1)^2 - 4\tilde{c}_2(1-K_1)K_2(\alpha\tilde{c}_1 - 1)}}{2\tilde{c}_2(1-K_1)}.$$

-continued $$l_1\psi_2\left(\frac{\exp(-l_2/\psi_2)}{1-\varepsilon} - 1\right) = \frac{1-\tilde{c}_2\psi_2}{\tilde{c}_1}.$$

$$C_0 = \begin{bmatrix} 0 & 0 & P_D^{max} & P_D^{max} & 0 \\ 0 & P_C^{max} & P_C^{max} & 0 & 0 \end{bmatrix},$$

$$A_0 = \begin{bmatrix} 1 & 0 & 1 & 0 \\ 0 & 1 & 0 & 1 \\ 0 & P_C^{max} & P_D^{max} & 0 \end{bmatrix}, \Delta_0 = \begin{bmatrix} -1 & 0 \\ 0 & -1 \\ 1 & 0 \\ 0 & 1 \end{bmatrix}, \delta_0 = \begin{bmatrix} 0 \\ 0 \\ P_D^{max} \\ P_C^{max} \end{bmatrix}.$$

For a matrix $M_{n \times n}$, the following is defined:

$$M_{a:b,c:d} \triangleq \begin{bmatrix} M_{a,c} & \cdots & M_{a,d} \\ \vdots & \ddots & \vdots \\ M_{b,c} & \cdots & M_{b,d} \end{bmatrix},$$

$$M_{a:b,:} \triangleq M_{a:b,1:n}, M_{:,c:d} \triangleq M_{1:n,c:d}.$$

Proposed Algorithm for Solving (Equation 43)

The steps for solving the maximization problem (Equation 43) are summarized in Algorithm 2:

---

Algorithm 2: Maximizing the objective of problem (Equation 43)

---

Input: $C_0$, $A_0$, $\Delta_0$, $\delta_0$, $\alpha$, a, $K_1$, $K_2$, $K_3$, $l_1$, $l_2$, $x_H$, $\{\tilde{c}_{1,j}\}_{j=1}^{b}$, $\{\tilde{c}_{2,j}\}_{j=1}^{b}$, $\sigma_D^2$ $P_C^{max}$, $P_D^{max}$
Output: The optimal WD 16 power $P_C^o$, the optimal D2D pair 18 power $P_D^o$, and $w^o$ 1: Set $\tilde{i} = 0$, $C = C_0$, $A = A_0$, $\Delta = \Delta_0$, and $\delta = \delta_0$.
2: for j = 1: b do
3:   for i = 1:$n_A$ do 4:     Compute $s = [\tilde{x}, \tilde{y},]^T$ where $\tilde{x} = \dfrac{A_{2,i} - \tilde{c}_{1,j}A_{3,i}}{\tilde{c}_{2,j}A_{2,i} - \tilde{c}_{1,j}A_{1,i}}$ and $\tilde{y} = \dfrac{\tilde{c}_{2,j}A_{3,i} - A_{1,i}}{\tilde{c}_{2,j}A_{2,i} - \tilde{c}_{1,j}A_{1,i}}.$ 5:     if $\Delta \cdot s^o \delta$ and $\tilde{i} == 0$ then
6:       Set $i_1 = i$, $\tilde{i} = 1$, and $s_1 = s$ where $s_1 \triangleq [x_1, y_1]^T$.
7:     else if $\Delta \cdot s^o \delta$ and $\tilde{i} == 1$ then
8:       Set $i_2 = i$ and $s_2 = s$ where $s_2 \triangleq [x_2, y_2]^T$.
9:     endif
10:   endfor
11:   if $\tilde{i} > 0$ then
12:     Set $C_1 \triangleq C_{:,1:i_1}$, $C_2 \triangleq C_{:,i_2+1:n_C}$, $A_1 \triangleq A_{:,1:i_1}$, and $A_2 \triangleq A_{:,i_2:n_A}$.
13:     Update $C = [C_1, s_1, s_2, C_2]$, $A = [A_1, c, A_2]$ where $c \triangleq [\tilde{c}_{2,j}, \tilde{c}_{1,j}, 1]^T$.
14:     Update $\Delta = [\Delta^T, c_{1:2}^T]^T$ and $\delta = [\delta^T, 1]^T$
15:   endif
16: endfor
17: Check the feasibility $\Delta \cdot s_i^o \delta$.
18: Set $i_s = 2$ and $i_f = n_A - 1$.
19: if $A_{1:2,i_s} == [0,1]^T$ then 20:   Set $i_s = 3$, $T_{:,1} = [x_H, P_C^{max}]^T$, and $Q_{:,1} = \left[K_2\left(\dfrac{K_1}{1 - \alpha/P_C^{max}} - 1\right)^{-1}, P_C^{max}\right]^T$ 21: elseif $A_{1:2,i_f} == [1,0]^T$ then 22:   Set $i_f = n_A - 2$, $T_{:,n_A-2} = \left[P_D^{max}, l_1 P_D^{max}\left(\dfrac{\exp(-l_2/P_D^{max})}{1-\varepsilon} - 1\right)\right]^T$, $$Q_{:,n_A-2} = \left[P_D^{max}, \alpha\left(1 - \dfrac{K_1}{1 + K_2/P_D^{max}}\right)^{-1}\right]^T$$

23: end if
24: for j = $i_s$ :$i_f$ do

25:   Set $T_{:,j-1} = \left[\psi_2, \dfrac{1-\tilde{c}_2\psi_2}{\tilde{c}_1}\right]^T$ and $Q_{:,j-1} = \left[\psi_1, \dfrac{1-\tilde{c}_2\psi_1}{\tilde{c}_1}\right]^T$ with $\tilde{c}_1 = A_{2,j}$ and $\tilde{c}_2 = A_{1,j}.$ 26: end for
27: Find the indexes $j_1$ and $j_2$ such that $\Delta \cdot T_{:,j_1} \; ^o \; \delta$ and $\Delta \cdot Q_{:,j_2} \; ^o \; \delta$.
28: Define $\tilde{C} = \{T_{:,j_1}, C_{:,j_1+2:j_2+1}, Q_{:,j_2}\}$ and set $P^o = \tilde{C}$.

29:   for k = 1: $n_{\tilde{C}} - 1$ do

30:     if $A_{1:2,k+j_1} == [1,0]^T$ or $A_{1:2,k+j_1} == [0,1]^T$ then return
31:     else 32:       Compute $z = \left[x_r, \dfrac{1-A_{1,k+j_1}x_r}{A_{2,k+j_1}}\right]^T$ where $x_r$ is the root of (36) with $\tilde{C}_{1,k} \leq x_r \leq \tilde{C}_{1,k+1}$

| Algorithm 2: Maximizing the objective of problem (Equation 43) |
|---|
| 33: Update $P^o = P^o \cup \{z\}$ |
| 34: end if |
| 35: end for |

36: Enumerate among candidate solution set $P^o$ to find the optimal solution.
37: Obtain the optimal beam vector.

Approach to solve the expected sum-rate maximization problem P1

Step 2: The Feasibility Test

Lemma 3

The necessary and sufficient condition for feasibility of D2D communication with imperfect CSI is given by:

$$0 < x_I \leq P_D^{max}, \quad (44)$$

$$0 < y_I \leq P_C^{max}, \quad (45)$$

$$\tilde{c}_{1,j} y_I + \tilde{c}_{2,j} x_I \leq 1, j=1,\ldots,b \quad (46)$$

where $\tilde{c}_{1,j} \triangleq \lambda_{C,j}/\tilde{I}$ and $\tilde{c}_{2,j} \triangleq \lambda_{D,j}/\tilde{I}$ and $(x_I, y_I)$ is the numerical solution of the following system of equations:

$$y = \alpha\left(1 - \frac{K_1}{1+K_2/x}\right)^{-1} \quad (47)$$

$$y = l_1 x\left(\frac{\exp(-l_2/x)}{1-\varepsilon} - 1\right) \quad (48)$$

where $$l_1 = \frac{\eta_2}{\eta_1 \tilde{\gamma}_D} \text{ and } l_2 = \eta_1 \sigma_D^2 \tilde{\gamma}_D.$$

The cumulative density function (CDF) for random variable $$Z = \frac{X}{\sigma_D^2 + Y}$$

is first obtained where X: $\exp(\eta_1/x)$ and Y: $\exp(\eta_2/y)$.

$$F_Z(z) = Pr\left\{\frac{X}{\sigma_D^2 + Y} \leq z\right\} \quad (49)$$

$$= \int_0^\infty f_Y(t) F_X(z(\sigma_D^2 + t)) dt$$

$$= \int_0^\infty \frac{\eta_2 \exp(-\eta_2 t/y)}{y}(1 - \exp(-\eta_1 z(\sigma_D^2+t)/x)) dt$$

$$= 1 - \frac{\eta_2/y}{\eta_1/x + \eta_2/y} \exp(-\eta_1 z \sigma_D^2/x).$$

The constraint Equation 41 can be written as $F_Z(\tilde{\gamma}_D) \leq \varepsilon$, i.e., $$y \leq l_1 x\left(\frac{\exp(-l_2/x)}{1-\varepsilon} - 1\right). \quad (50)$$

It is shown that $$g(x) = l_1 x\left(\frac{\exp(-l_2/x)}{1-\varepsilon} - 1\right)$$

is a convex and increasing function of x. Furthermore, the D2D pair 18 SINR requirement (Equation 50) can be satisfied only if:

$$x \geq x_{min} \triangleq \frac{-\eta_1 \sigma_d^2 \tilde{\gamma}_D}{\ln(1-\varepsilon)}. \quad (51)$$

The solution of $$\alpha\left(1 - \frac{K_1}{1+K_2/x}\right)^{-1} = l_1 x\left(\frac{\exp(-l_2/x)}{1-\varepsilon} - 1\right)$$

is $x_I$, which can be found using the bisection algorithm within the range $x_{min} \leq x \leq P_D^{max}$.

Figure 6:
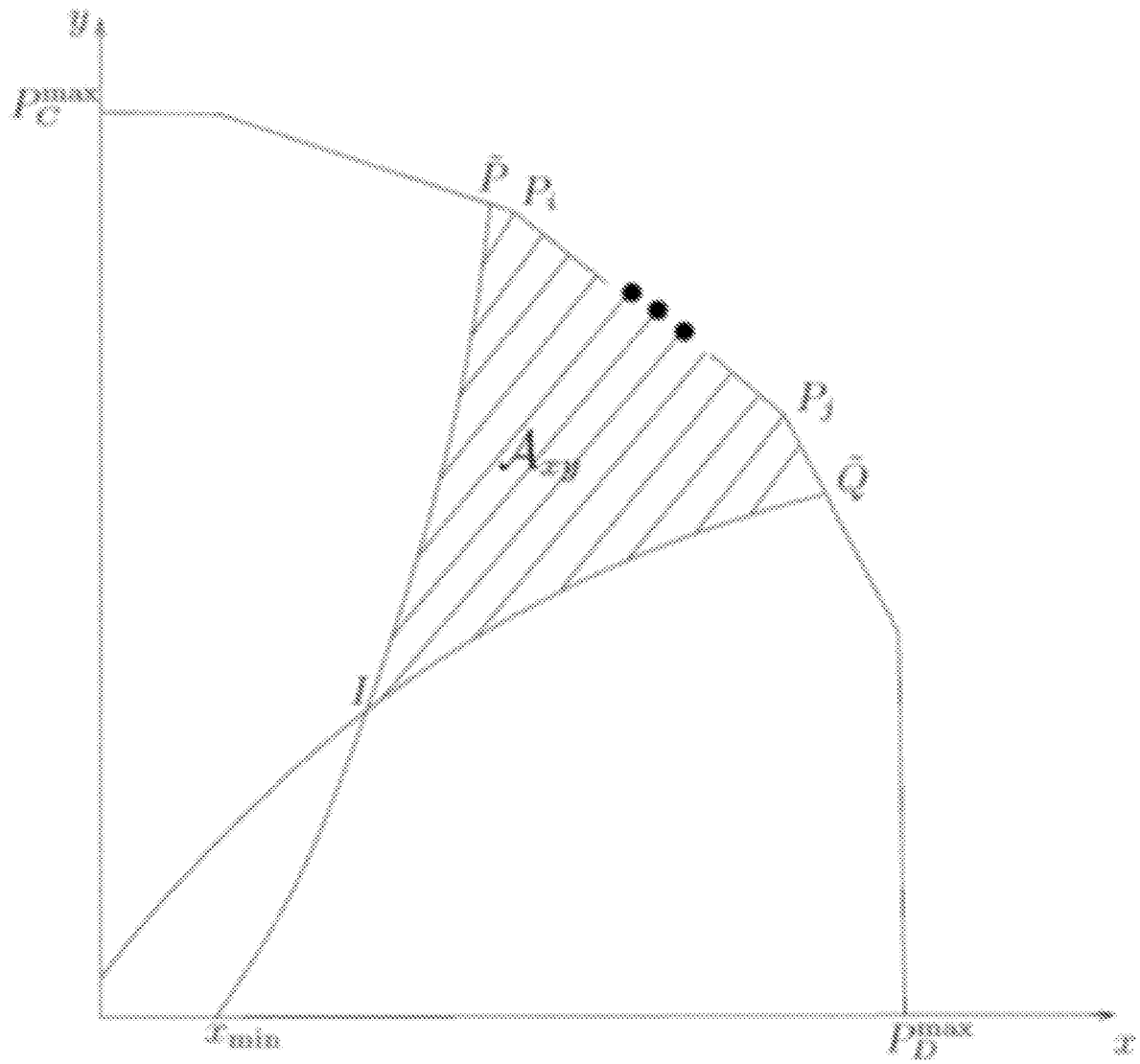
FIG. 6 is a diagram showing the feasibility region for solving the optimal power allocation problem for Embodiment 2.
Figure 7:
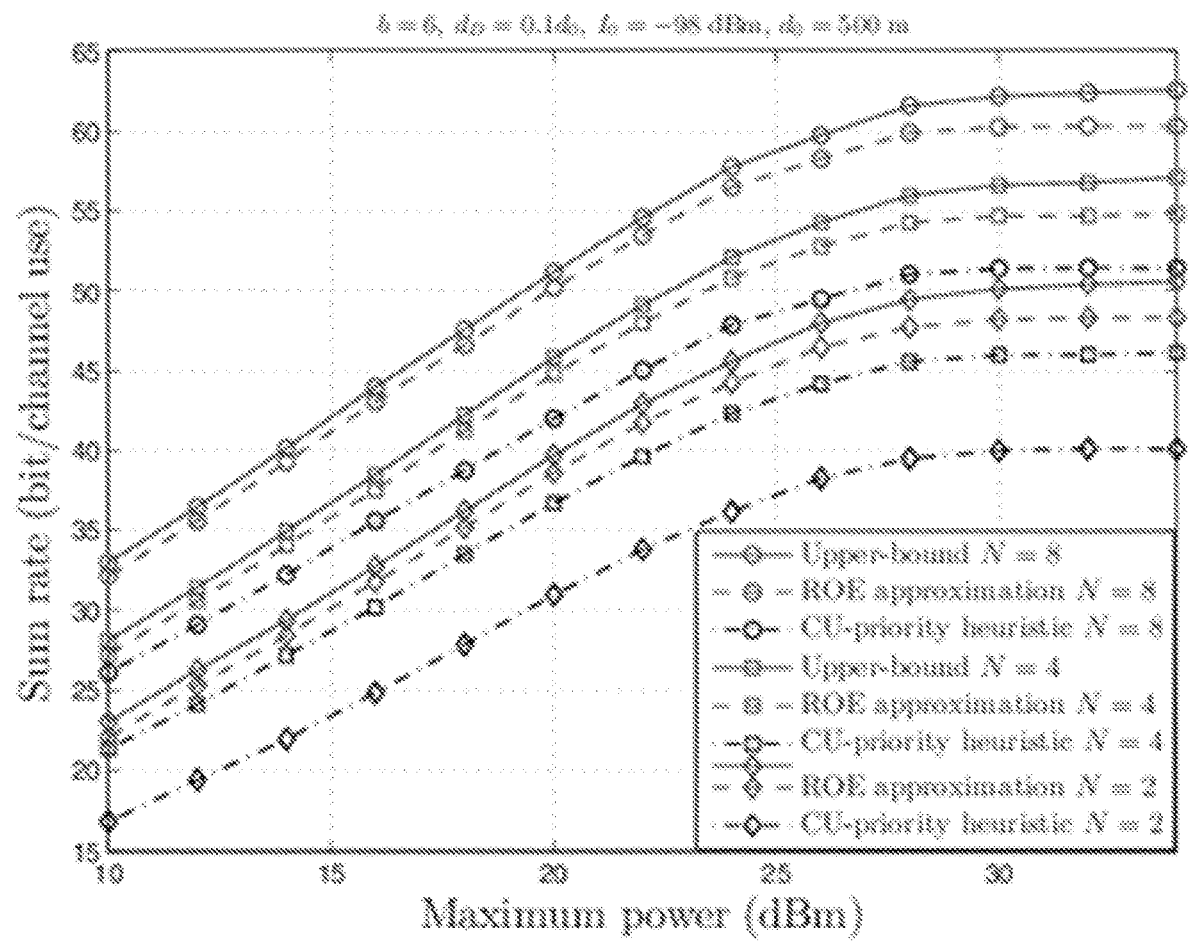
FIG. 7 is a diagram depicting a graph of sum rate vs. maximum power for a D2D pair/WD pairing utilizing the principles of the present disclosure.
Figure 8:
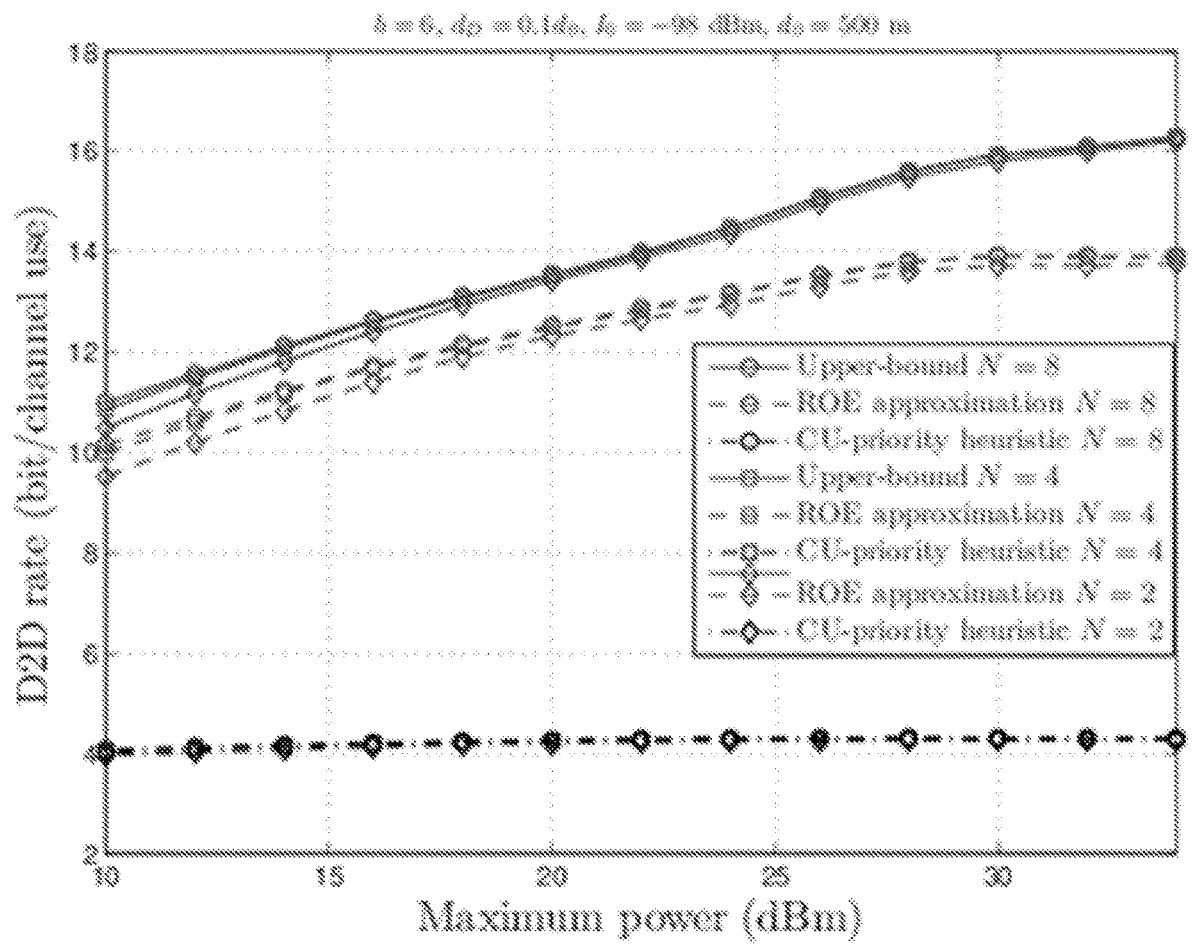
FIG. 8 is a diagram depicting a graph of D2D rate vs. maximum power for a D2D pair/WD pairing utilizing the principles of the present disclosure.
Figure 9:
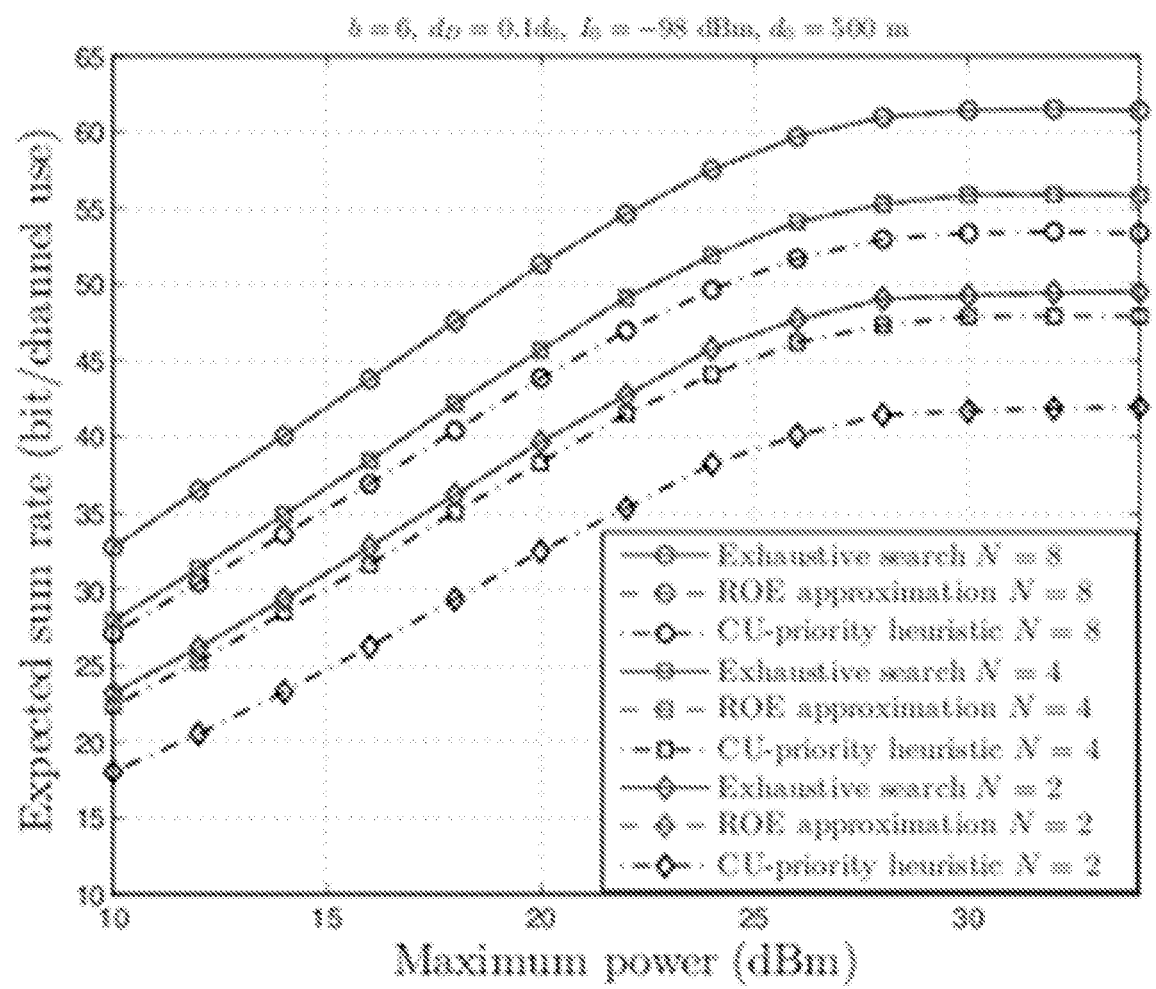
FIG. 9 is a diagram depicting a graph of expected sum rate vs. maximum power for a D2D pair/WD pairing utilizing the principles of the present disclosure.
Figure 10:
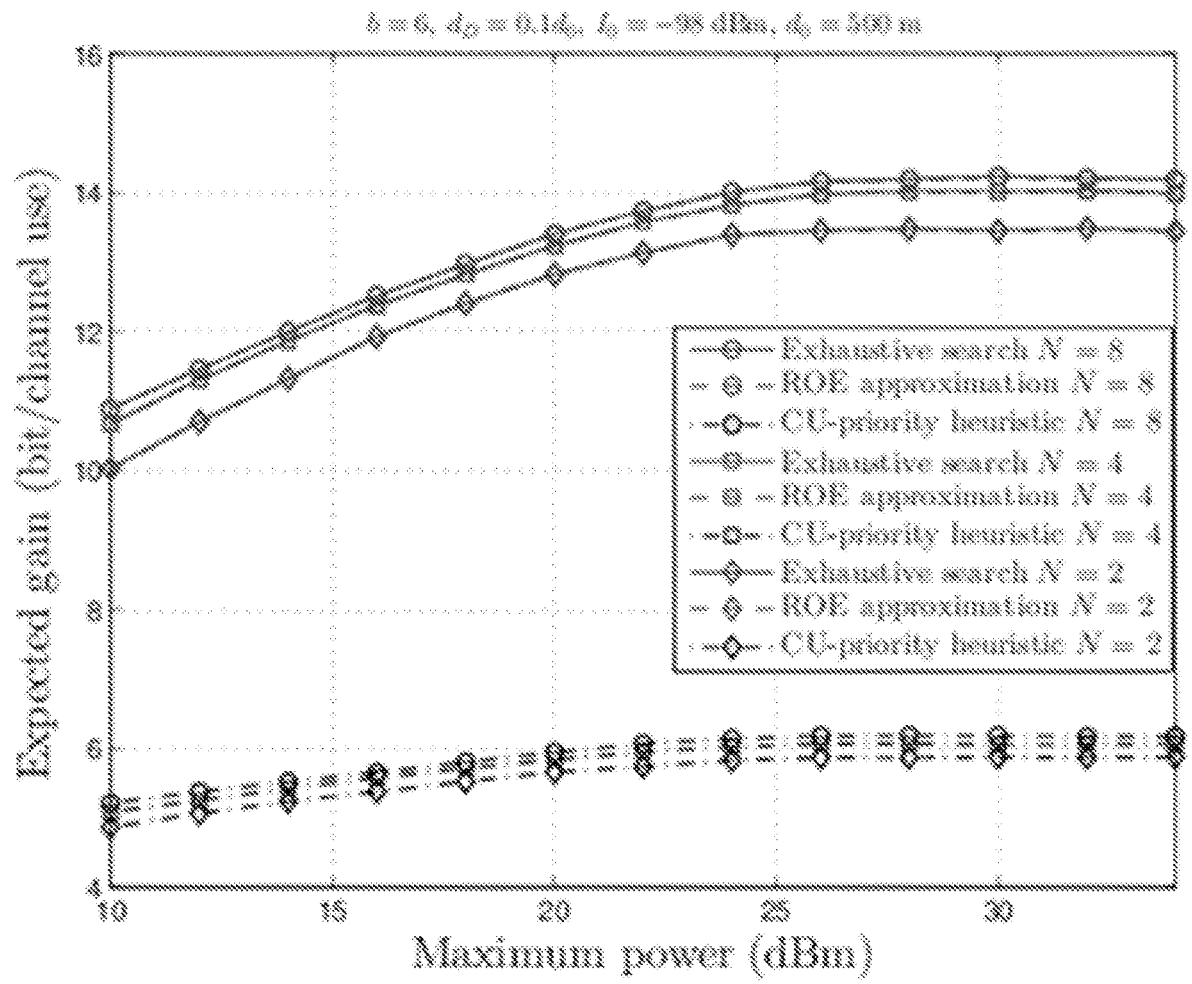
FIG. 10 is a diagram depicting a graph of expected gain vs. maximum power for a D2D pair/WD pairing utilizing the principles of the present disclosure.
Figure 11:
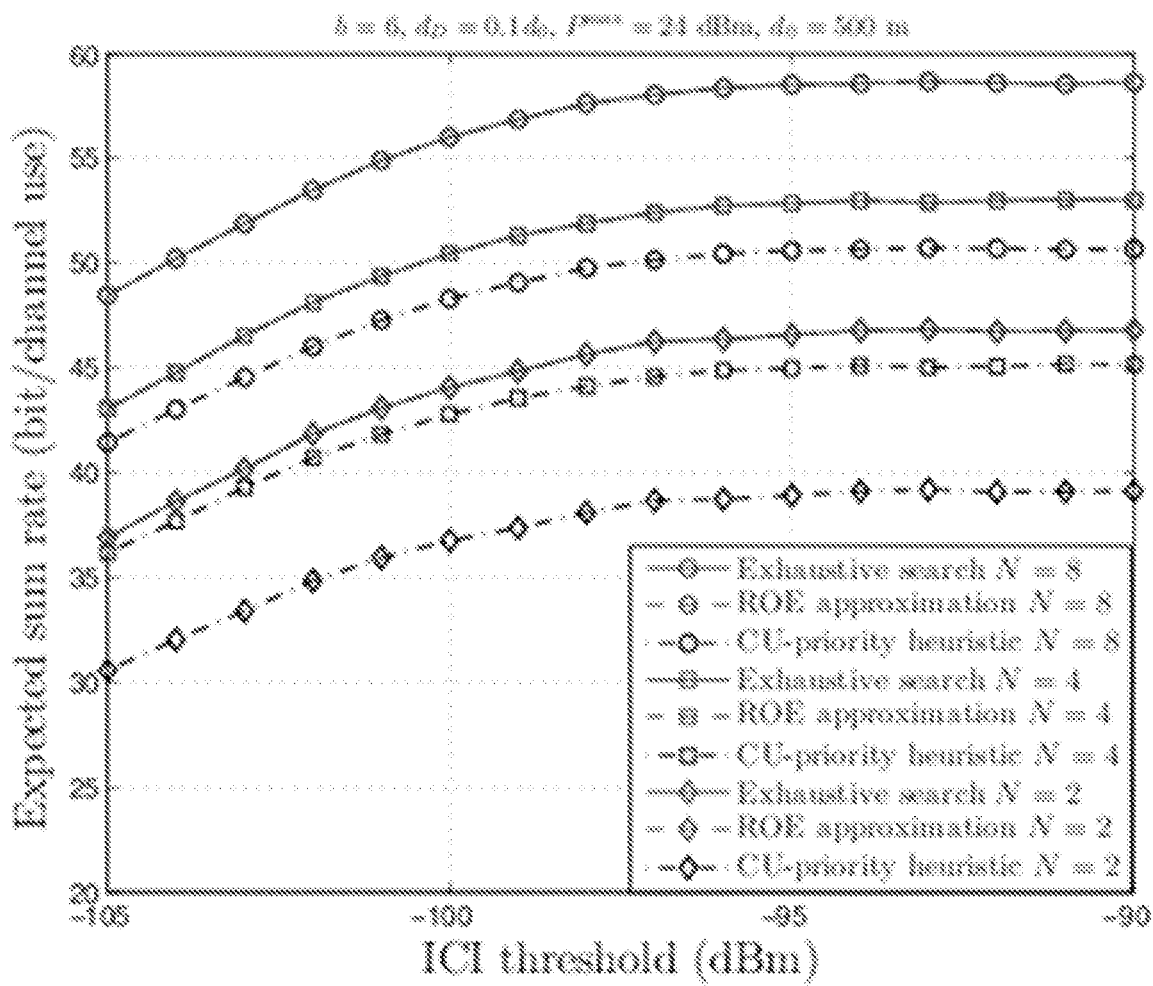
FIG. 11 is a diagram depicting a graph of expected sum rate vs. ICI threshold for a D2D pair/WD pairing utilizing the principles of the present disclosure.
Figure 12:
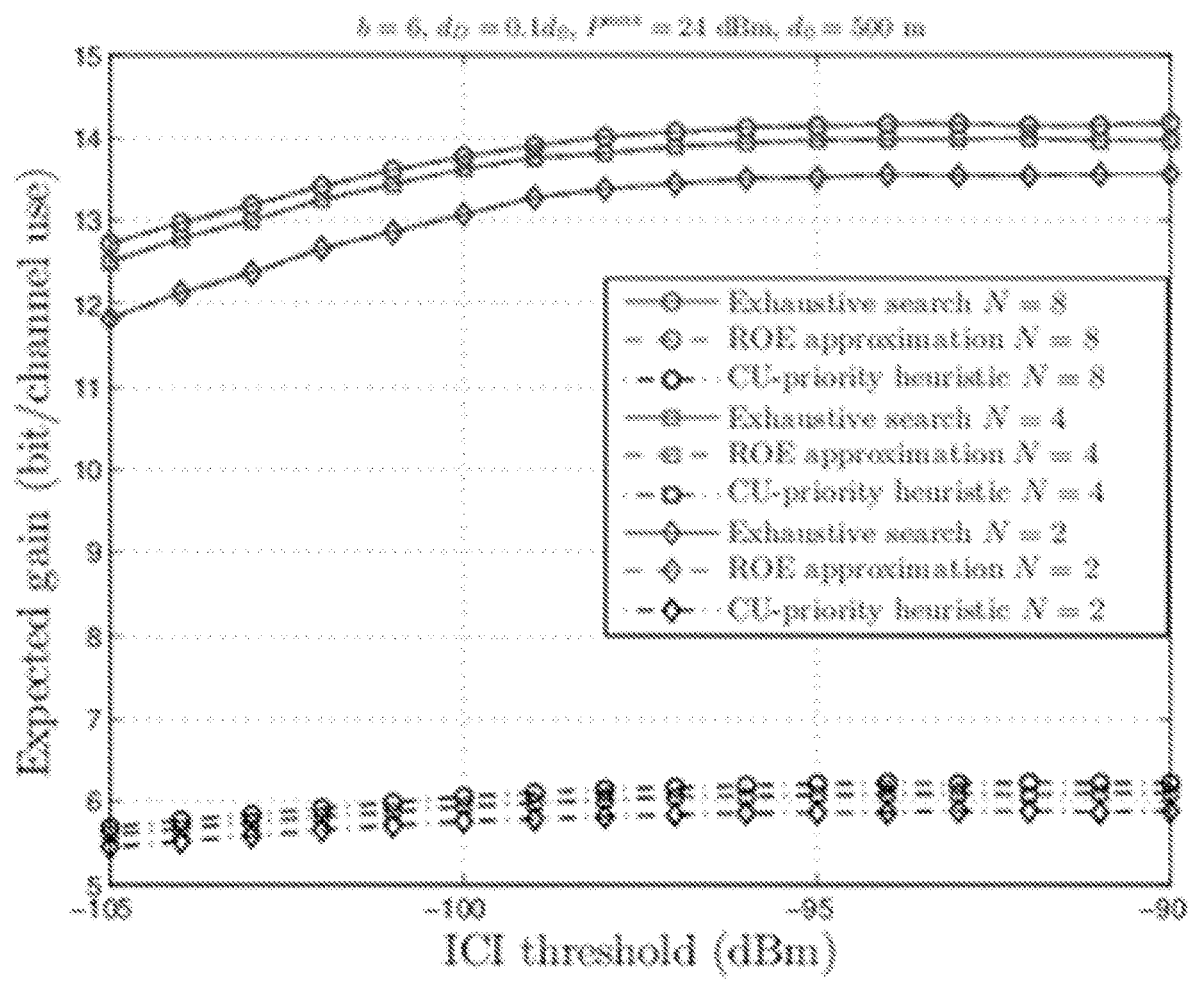
FIG. 12 is a diagram depicting a graph of expected gain vs. ICI threshold for a D2D pair/WD pairing utilizing the principles of the present disclosure.
Figure 13:
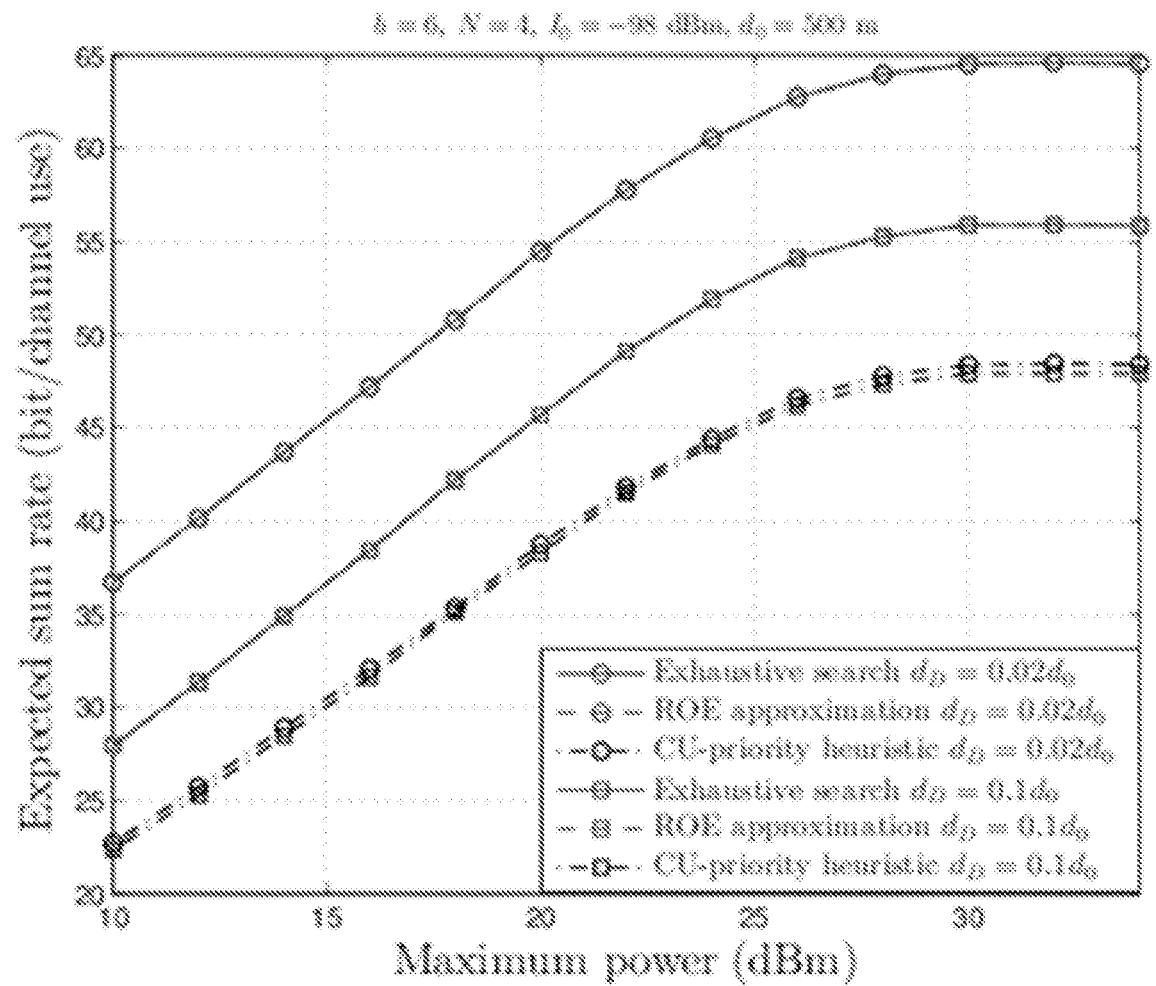
FIG. 13 is a diagram depicting a graph of expected sum rate vs. maximum power for a D2D pair/WD pairing under different constraints than FIG. 7 utilizing the principles of the present disclosure.
Figure 14:
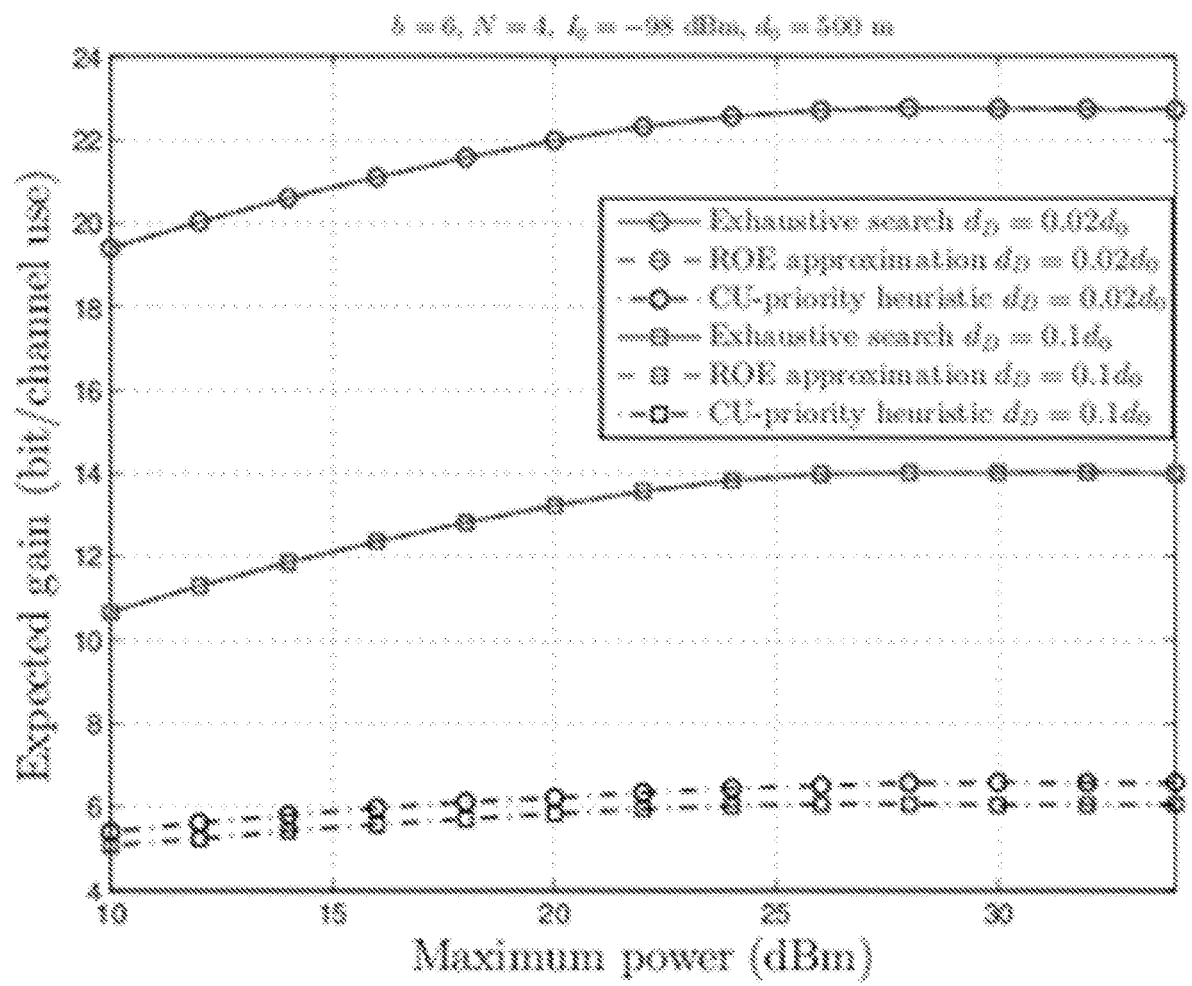
FIG. 14 is a diagram depicting a graph of expected gain vs. maximum power for a D2D pair/WD pairing under different constraints than FIG. 8 utilizing the principles of the present disclosure.
Figure 15:
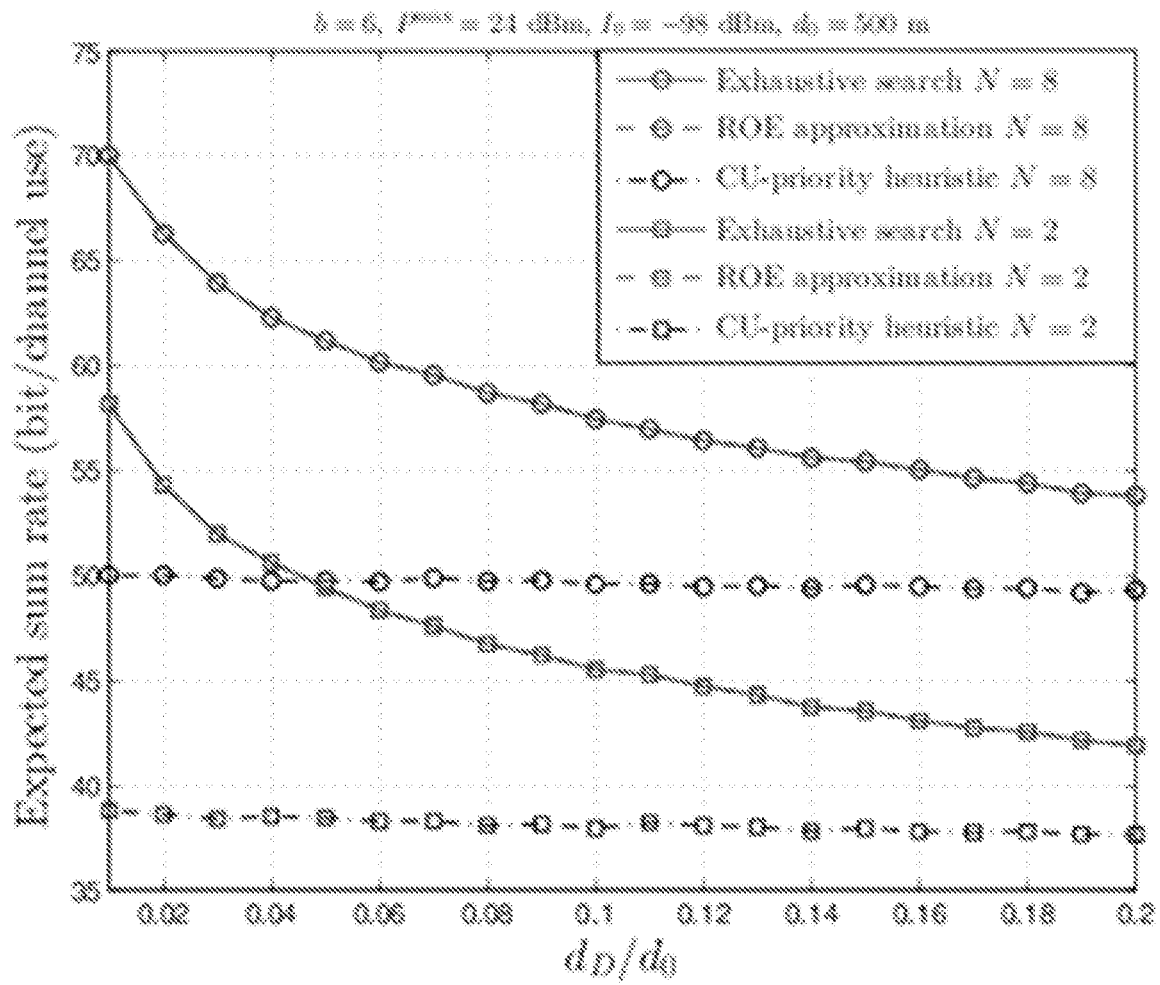
FIG. 15 is a diagram depicting a graph of expected sum rate vs. the ratio of D2D distance ($d_D$) to cell radius ($d_0$) for a D2D pair/WD pairing utilizing the principles of the present disclosure.
Figure 16:
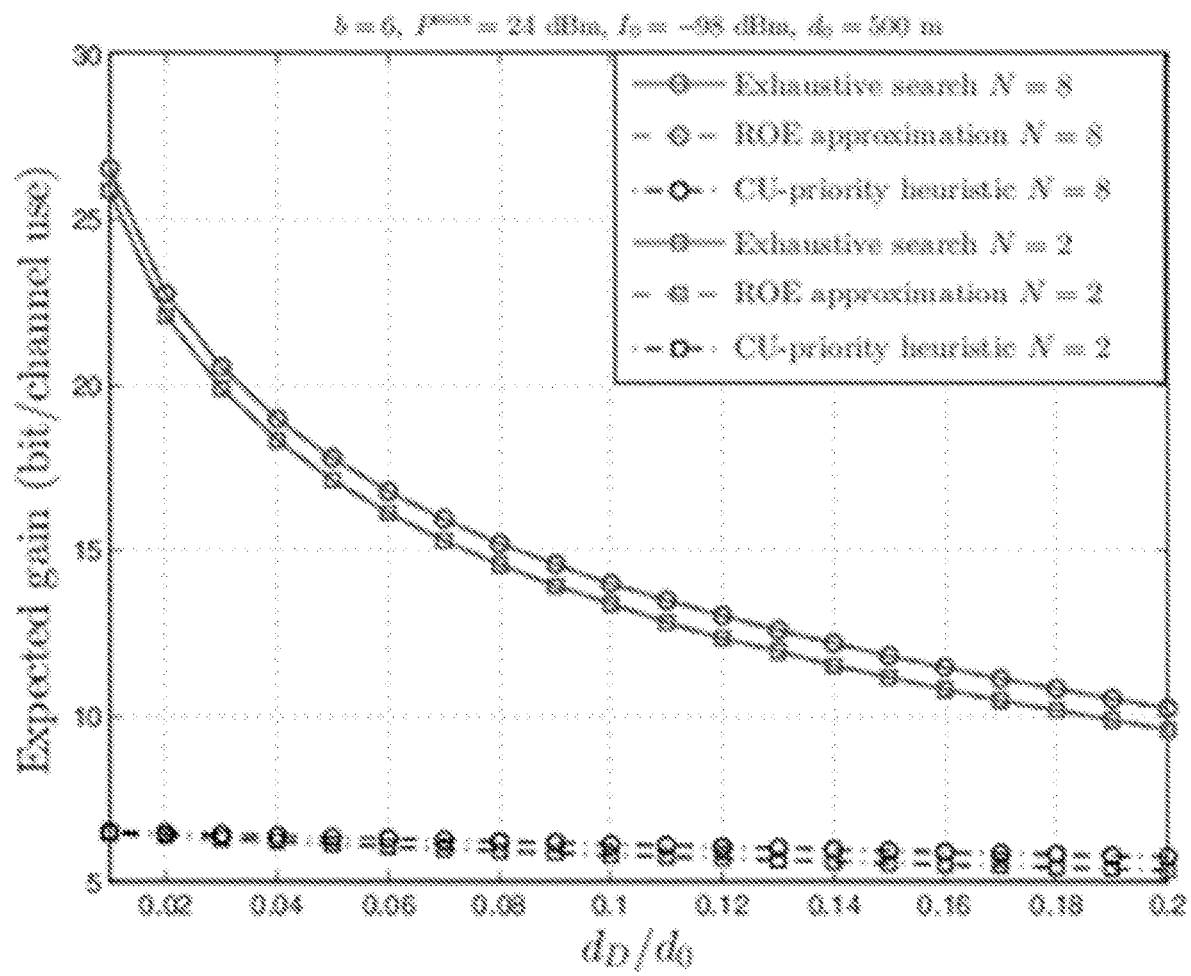
FIG. 16 is a diagram depicting a graph of expected gain vs. the ratio of D2D distance ($d_D$) to cell radius ($d_0$) for a D2D pair/WD pairing utilizing the principles of the present disclosure.

As an example, the feasible region for problem P1 is shown in FIG. 6.

After substituting the optimal beam vector (Equation 11) into (Equation 5), the problem of maximizing the expected sum rate for a D2D pair 18 and a WD 16 becomes:

$$P2: \max_{(x,y)} R(x,y) \quad (52)$$

$$\text{subject to } y\left(1 - \frac{K_1 x}{K_2 + x}\right) b \geq \tilde{\gamma}_C,$$

$$y \leq l_1 x\left(\frac{\exp(-l_2/x)}{1-\varepsilon} - 1\right), \quad (53)$$

$$y \leq P_C^{max}, x \leq P_D^{max}, \quad (54)$$

$$\tilde{c}_{1,j} y + \tilde{c}_{2,j} x \leq 1, j=1,\ldots b \quad (55)$$

where $$R(x,y) = \log_2(e)\left(\ln\left(\left(1+y\left(1-\frac{K_1 x}{K_2+x}\right)b\right)\right) + E[\ln(1+\gamma_D)]\right).$$

Lemma 4

If the D2D pair 18 and WD power 16 is given by x and y, respectively, the expected D2D rate becomes $$E[\ln(1+\gamma_D)] = \quad (56)$$

$$\frac{\eta_2 x}{\eta_1 y - \eta_2 x}\left(\exp\left(\frac{\eta_2 \sigma_D^2}{y}\right)E_1\left(\frac{\eta_2 \sigma_D^2}{y}\right) - \exp\left(\frac{\eta_1 \sigma_D^2}{x}\right)E_1\left(\frac{\eta_1 \sigma_D^2}{x}\right)\right)$$

where $$E_1(x) = \int_0^\infty \frac{\exp(-t)}{t} dt.$$

Assuming $|h_D|^2$: $\exp(\eta_1)$ and $|g_C|^2$: $\exp(\eta_2)$, we have $$E[\log(1+\gamma_D)] = \int_0^\infty \int_0^\infty \log\left(1 + \frac{xu}{\sigma_D^2 + yv}\right) \qquad (57)$$
$$\eta_1 \exp(-\eta_1 u) \eta_2 \exp(-\eta_2 v) du dv$$
$$= \int_0^\infty \int_0^\infty \frac{x}{\sigma_D^2 + yv + xu} \exp(-\eta_1 u) \eta_2$$
$$\exp(-\eta_2 v) du dv$$
$$= \int_0^\infty \exp(\eta_1(\sigma_D^2 + yv)/x)$$
$$E_1(\eta_1(\sigma_D^2 + yv)/x) \eta_2 \exp(-\eta_2 v) dv$$
$$= \frac{\eta_2 x}{\eta_1 y} \int_{\frac{\eta_1 \sigma_D^2}{x}}^\infty \exp(t) E_1(t)$$
$$\exp\left(-\frac{\eta_2 x}{\eta_1 y} t + \frac{\eta_2 \sigma_D^2}{y}\right) dt$$
$$= \frac{\eta_2 x}{\eta_1 y - \eta_2 x}\left(\exp\left(\frac{\eta_2 \sigma_D^2}{y}\right) E_1\left(\frac{\eta_2 \sigma_D^2}{y}\right) - \exp\left(\frac{\eta_1 \sigma_D^2}{x}\right) E_1\left(\frac{\eta_1 \sigma_D^2}{x}\right)\right).$$

In order to simplify the notations, the variables $$\hat{x} \triangleq \frac{\eta_1 \sigma_D^2}{x} \text{ and } \hat{y} \triangleq \frac{\eta_2 \sigma_D^2}{y}$$

are changed. Then the vertical boundary line $x=P_D^{max}$ and horizontal boundary line $y=P_C^{max}$ can be represented by $\hat{x}=v_1$ and $\hat{y}=v_2$, respectively with $$v_1 = \frac{\eta_1 \sigma_D^2}{P_D^{max}} \text{ and } v_2 = \frac{\eta_2 \sigma_D^2}{P_C^{max}}.$$

Similarly, the tilted boundary line $\tilde{c}_{1,j}y + \tilde{c}_{2,j}x = 1$ can be written as $\hat{c}_{1,j}/\hat{y} + \hat{c}_{2,j}/\hat{x} + 1$ with $\hat{c}_{1,j} = \tilde{c}_{1,j}\eta_2\sigma_D^2$ and $\hat{c}_{2,j} = \tilde{c}_{2,j}\eta_1\sigma_D^2$ for $j=1, \ldots, b$.

Lemma 5

The optimal power pair $(\hat{x}^o, \hat{y}^o)$ to maximize P2 is given in one of the two cases: 1) An end point of the horizontal, vertical, or tilted boundary line segment(s) of $A_{xy}$; or 2) an interior point of the horizontal, vertical, or tilted boundary line segment(s) of $A_{xy}$, where $\hat{x}$ and $\hat{y}$ are obtained in the following cases:

1. Vertical boundary line: $\hat{x}=v_1$ and $\hat{y}$ is a simple root of the equation $$h_V(\hat{y}) = \frac{-\hat{\alpha}_3(\hat{y} - v_1)^2}{\hat{y}(\hat{y} + \hat{\alpha}_3)f_V(\hat{y})} - \frac{v_1 V_1}{f_V(\hat{y})} + \frac{\hat{y} - v_1}{f_V(\hat{y})} - \exp(\hat{y})E_1(\hat{y}) = 0 \qquad (58)$$

where $\hat{\alpha}_3 = b\eta_2\sigma_D^2(1-K_1 P_D^{max}/(K_2 + P_D^{max}))$, $V_1 = E_1(v_1)\exp(v_1)$, and $f_V(\hat{y}) = \hat{y}^2 - \hat{y}v_1 - v_1$.

2. Horizontal boundary line: $\hat{y}=v_2$ and $\hat{x}$ is a simple root of the equation $$h_H(\hat{x}) = \frac{-\hat{\beta}\hat{K}_1(v_2 - \hat{x})^2}{(\hat{K}_2 + \hat{x})((\hat{\beta}+1)(\hat{K}_2+\hat{x}) - \hat{K}_1\hat{\beta})f_H(\hat{x})} + \frac{v_2 V_2}{f_H(\hat{x})} + \frac{v_2(v_2-\hat{x})}{\hat{x}f_H(\hat{x})} - \exp(\hat{x})E_1(\hat{x}) = 0 \qquad (59)$$

where $\hat{\beta}=bP_C^{max}$, $\hat{K}_1 = K_1\eta_1\sigma_D^2/K_2$, $\hat{K}_2 = \eta_1\sigma_D^2/K_2$, $V_2 = E_1(v_2)\exp(v_2)$, and $f_V(\hat{x}) = v_2^2 + v_2 - v_2\hat{x}$.

3. Tilted boundary line: $\hat{c}_{1,j}/\hat{y} + \hat{c}_{2,j}/\hat{x} = 1$ where $x\hat{x}$ is a simple root of the equation $$h_T(\hat{x}) = f_{1,T}(\hat{x}) + f_{2,T}\exp(\hat{x})E_1(\hat{x}) - f_{3,T}\exp(g_T(\hat{x}))E_1(g_T(\hat{x}))$$
$$= 0 \qquad (60)$$

where $$f_{1,T}(\hat{x}) = \frac{\hat{b}_{2,j}\hat{x}^{-2}(1 - \hat{K}_1/(\hat{K}_2+\hat{x})) + \hat{K}_1/(\hat{K}_2+\hat{x})^2(\hat{b}_{1,j} - \hat{b}_{2,j}/\hat{x})}{1 + (\hat{b}_{1,j} - \hat{b}_{2,j}/\hat{x})(1 - \hat{K}_1/(\hat{K}_2+\hat{x}))} -$$
$$\frac{\hat{c}_{1,j}}{\hat{x}(\hat{c}_{1,j} + \hat{c}_{2,j} - \hat{x})^2} - \frac{\hat{c}_{1,j}\hat{c}_{2,j}}{(\hat{x} - \hat{c}_{2,j})(\hat{c}_{1,j} + \hat{c}_{2,j} - \hat{x})},$$

$$f_{2,T}(\hat{x}) = \frac{\hat{c}_{1,j}}{(\hat{c}_{1,j} + \hat{c}_{2,j} - \hat{x})^2} - \frac{\hat{c}_{1,j}^2}{\hat{c}_{1,j} + \hat{c}_{2,j} - \hat{x}},$$

$$f_{3,T}(\hat{x}) = \frac{\hat{c}_{1,j}}{(\hat{c}_{1,j} + \hat{c}_{2,j} - \hat{x})^2} - \frac{\hat{c}_{1,j}^2 \hat{c}_{2,j}}{(\hat{c}_{1,j} + \hat{c}_{2,j} - x)(\hat{x} - \hat{c}_{2,j})^2},$$

$$g_T(\hat{x}) = \frac{\hat{c}_{1,j}\hat{x}}{\hat{x} - \hat{c}_{2,j}}, \hat{c}_{1,j} = \eta_2\sigma_D^2\tilde{c}_{1,j}, \hat{c}_{2,j} = \eta_1\sigma_D^2\tilde{c}_{2,j},$$

$$\hat{b}_{1,j} = b/\tilde{c}_{1,j}, \text{ and } \hat{b}_{2,j} = b\tilde{c}_{2,j}\eta_1\sigma_D^2/\tilde{c}_{1,j}.$$

The proof herein is only for the tilted boundary line. The other cases can be proved similarly. If ICI constraint j (Equation 42) is active at optimality, the optimal power is the solution of the following optimization problem:

$$\max_{(\hat{x},\hat{y})} \ln\left(1 + \frac{\hat{b}}{\hat{y}}\left(1 - \frac{\hat{K}_1}{\hat{K}_2+\hat{x}}\right)\right) + \frac{\hat{y}}{\hat{y}-\hat{x}}(\exp(\hat{x})E_1(x) - \exp(\hat{y})E_1(\hat{y}))$$

subject to $\frac{\hat{c}_{1,j}}{\hat{y}} + \frac{\hat{c}_{2j}}{\hat{x}} = 1$ where $\hat{b} \triangleq b\eta_2\sigma_D^2$. Substituting $$\hat{y} = \frac{\hat{c}_{1,j}\hat{x}}{\hat{x} - \hat{c}_{2,j}}$$

into the objective function above results in $\max_x R(\hat{x})$, where $$R(\hat{x}) \triangleq \ln\left(1 + (\hat{b}_{1,j} - \hat{b}_{2,j}/\hat{x})\left(1 - \frac{\hat{K}_1}{\hat{K}_2+\hat{x}}\right)\right) +$$
$$\frac{\hat{c}_{1,j}}{\hat{c}_{1,j} + \hat{c}_{2,j} - \hat{x}}(\exp(\hat{x})E_1(\hat{x}) - \exp(g_T(\hat{x}))E_1(g_T(\hat{x}))).$$

Since $R(\hat{x})$ is continuous and has a first-order derivative, the optimum $\hat{x}^o$ is either an end point of the interval defied by $A_{xy}$, or obtained by solving $dR(\hat{x})/d\hat{x}=0$, which results in the equation in (Equation 60).

Note that the equations (Equation 58)-(Equation 60) should be solved numerically. However, simulations show that $h_V(\hat{y})=0$ and $h_H(\hat{x})=0$ do not have a valid solution in the specific intervals determined by $A_{xy}$. Furthermore, $h_T(\hat{x})=0$ may have at most one root in the interval $\hat{x}_{min} \le \hat{x} \le \hat{x}_{max}$ where $\hat{x}_{min}$ and $\hat{x}_{max}$ are obtained by C in Algorithm 2. Hence, the solution can be obtained using the bisection algorithm.

Considering the objective in P1, a numerical equation needs to be solved to solve the optimal power allocation problem over each boundary line. There is no closed-form solution for these equations. In order to tackle this issue, another objective is considered, as follows.

Using Jensen's inequity, $E[\log_2(1+\gamma_D)] \le \log_2(1+E[\gamma_D])$. After replacing the objective in P1, the following problem is analyzed:

$$P3: \max_{(x,y)} R_U(x, y)$$

subject to (52-55),
where $R_U = (1+\gamma_C)(1+E[\gamma_D])$. It can be shown that $$E[\gamma_D] = \frac{x\eta_2}{y\eta_1} \exp\left(\frac{\sigma_D^2 \eta_2}{y}\right) E_1\left(\frac{\sigma_D^2 \eta_2}{y}\right). \tag{61}$$

By solving P3, it can be shown that the optimal power is always at one end of the vertical or horizontal boundary lines of the feasible region, i.e., there is no need to solve any equation corresponding to the vertical and horizontal boundary lines.

Proposition 3

If the boundaries of the feasible region $A_{xy}$ do not include $\tilde{c}_{1,j} y + \tilde{c}_{2,j} x = 1$ for $j=1, \ldots, b$ then the optimal power pair $\{x^o, y^o\}$ for P3 is at one end point of the vertical or horizontal boundary line segment of $A_{xy}$. Substituting $y = P_C^{max}$ and $x = P_D^{max}$ into the objective of P3, $h(x) \triangleq R_U(x, P_C^{max})$ and $g(y) \triangleq R_U(P_D^{max}, y)$ are defined. To show that the maximum of $g(y)$ for $\tilde{a} \le y \le \tilde{b}$ is obtained when $y^o$ is at either $\tilde{a}$ or $\tilde{b}$, it is sufficient to show that $g(y)$ is a strictly monotonic function, or $g(y)$ is a strictly convex function. In the following, it is shown that $g(y)$ is such a function. In both cases, since P3 is a maximization problem, $y^o$ is an end point of the domain determined by $A^{xy}$. A similar proof is provided for $h(x)$. The function $g(y)$ can be written as $$g(y) = \left(\mu_1 y + \mu_2 + \frac{\mu_3}{y}\right) \exp\left(\frac{\mu}{y}\right) E_1\left(\frac{\mu}{y}\right) \tag{62}$$

where $$\mu_1 \triangleq b\left(1 - \frac{K_1 P_D^{max}}{K_2 + P_D^{max}}\right),$$

$\mu_3 \triangleq P_D^{max} \eta_2/\eta_1$, $\mu_2 \triangleq \mu_1 \mu_3 + 1$, and $\mu \triangleq \sigma_D^2 \eta_2$.

Taking the first derivative of $g(y)$, results in:

$$\frac{dg(y)}{dy} = \left(\mu_1 y + \mu_1 + \mu_2 + \frac{\mu_3}{y} - \frac{\mu_3}{y^2}\right) \exp\left(\frac{\mu}{y}\right) E_1\left(\frac{\mu}{y}\right) + \mu_1 + \frac{\mu_2}{y} + \frac{\mu_3}{y^2}. \tag{63}$$

Since $\mu_1 > 0$, $\mu_1 > 0$, $\mu_1 > 0$, $\mu > 0$, and $y \ge 0$, either $$\frac{dg(y)}{dy} = 0,$$

i.e., $g(y)$ is a strictly increasing function or $$\frac{dg(y)}{dy} = 0$$

may have a valid solution only if $\hat{\mu} \triangleq (-\mu_3/y^2 + \mu_3/y) \exp(\mu/y) E_1(\mu/y) + \mu_2/y + \mu y^2 < 0$ for some y. Supposing $\hat{\mu} < 0$ and taking the second derivative, the result is $$\frac{d^2 g(y)}{dy^2} = (\mu_1 y + 2\mu_1 + \mu_2 + \mu_3/y - 2\mu_3/y^2 + 2\mu_3/y^3) \exp(\mu/y) E_1(\mu/y) +$$

$$\mu_1 + \mu_2/y + \mu_3/y^3 - \mu_2/y^2 - 2\mu_3/y^3 > 0,$$

since $\hat{\mu} < 0$ implies $(\mu_3/y^2 - \mu_3/y) \exp(\mu/y) E_1(\mu/y) - \mu_3/y^2 - \mu_2/y > 0$. In other words, $g(y)$ is a convex function.

Similarly, $h(x)$ can be written as $$h(x) = (1 + \beta_1 x)\left(1 + \beta_2\left(1 - \frac{K_1}{K_2/x + 1}\right)\right)$$

where $$\beta_1 \triangleq \frac{\eta_2 \exp(\sigma_D^2 \eta_2 / P_C^{max}) E_1(\sigma_D^2 \eta_2 / P_C^{max})}{P_C^{max} \eta_1}$$

and $\beta_2 \triangleq b P_C^{max}$. Taking the first derivative of $h(x)$, the result is $$\frac{dh(x)}{dx} = \frac{\hat{h}(x) + \omega}{(x + K_2)^2}$$

where $\hat{h}(x) \triangleq \beta_1(1+\beta_2(1-K_1))x^2 + 2\beta_1 K_2(1+\beta_2(1-K_1))x$ and $\omega \triangleq \beta_1 K_2^2 + \beta_1 \beta_2 K_2^2 - \beta_2 K_1 K_2$. Since $K_1 \le 1$, $K_2 > 0$, $\beta_1 > 0$, $\beta_2 > 0$, and $x \ge 0$, either $h(x)$ is a strictl;y increasing function or $$\frac{dh(x)}{dx} = 0$$

may have a valid solution only if ω<0. Supposing ω<0 and taking the second derivative of h(x), the result is:

$$\frac{d^2h(x)}{dx^2} = \frac{2\beta_1 K_2(1+\beta_2(1-K_1))K_2 - 2\omega}{(x+K_2)^3} > 0,$$

i.e., h(x) is a convex function.

In order to find the optimal power pair as an interior point of a tilted boundary line segment, the variables $$\hat{x} = \frac{\eta_1 \sigma_D^2}{x} \text{ and } \hat{y} = \frac{\eta_2 \sigma_D^2}{y}$$

are changed.

Lemma 6

If the boundaries of the feasible region $A_{x,y}$ include $\tilde{c}_{1,j}y + \tilde{c}_{2,j}x = 1$ for some j, then the optimal power pair $(x^\circ, y^\circ)$ to maximize P3 is given in one of the two cases: 1) An end point of the horizontal, vertical, or tilted boundary line segment(s) of $A_{x,y}$; or 2) an interior point of tilted boundary line segment(s) of $A_{x,y}$, where $\hat{y}^\circ$ for $\hat{c}_{1,j}/\hat{y} + \hat{c}_{2,j}/\hat{x} = 1$ is one of the simple roots of the following equation:

$$J_T(\hat{y}) = J_{1,T}(\hat{y}) + J_{2,T}(\hat{y})\exp(\hat{y})E_1(\hat{y}) = 0 \quad (64)$$

where $$J_{1,T}(\hat{y}) = \frac{-t_{1,j}\hat{y}^2 + 2t_{2,j}\hat{y} - t_{2,j}t_{3,j}}{(\hat{y}^2 - t_{3,j}\hat{y})^2} + \frac{\hat{c}_{1,j} - \hat{y}}{\hat{c}_{2,j}\hat{y}}\left(1 + \frac{t_{1,j}\hat{y} - t_{2,j}}{\hat{y}^2 - t_{3,j}\hat{y}}\right),$$

$$J_{2,T}(\hat{y}) = \frac{(\hat{y} - \hat{c}_{1,j})(-t_{1,j}\hat{y}^2 + 2t_{2,j}\hat{y} - t_{2,j}t_{3,j})}{\hat{c}_{2,j}(\hat{y}^2 - t_{3,j}\hat{y})^2} + \frac{1 + \hat{y} - \hat{c}_{1,j}}{\hat{c}_{2,j}}\left(1 + \frac{t_{1,j}\hat{y} - t_{2,j}}{\hat{y}^2 - t_{3,j}\hat{y}}\right),$$

$$t_{1,j} = \frac{(\tilde{c}_{2,j}K_2 + 1 - K_1)\hat{b}}{\tilde{c}_{2,j}K_2 + 1},$$

$$t_{2,j} = \frac{(1-K_1)\hat{c}_{1,j}\eta_2\sigma_D^2 \hat{b}}{\tilde{c}_{2,j}K_2 + 1}, \text{ and } t_{3,j} = \frac{\hat{c}_{1,j}\eta_2\sigma_D^2}{\tilde{c}_{2,j}K_2 + 1}.$$

The proof is similar to Proposition 3.

In order to find the optimal powers for the D2D pair 18 and the WD 16 in P3, the objective function should be studied on tilted boundary lines of the feasible region. As shown in Lemma 6, a numerical equation involving $E_1(\bullet)$ function with no closed-form solution needs to be solved. To make this problem tractable, it is proposed to obtain the power through solving another problem as follows.

Step 3: The Proposed Solution

This disclosure proposes replacing the objective of P1 by $$\frac{xE[|h_D|^2]}{\sigma_D^2 + yE[|g_C|^2]}.$$

It is observed through simulation that this can be done without almost any performance degradation. In other words, it is proposed to solve the following problem:

$$P4: \max_{(x,y)} \log_2\left(1 + y\left(1 - \frac{K_1 x}{K_2 + x}\right)b\right) + \log_2\left(1 + \frac{xE[|h_D|^2]}{\sigma_D^2 + yE[|g_C|^2]}\right),$$

subject to (52-55).

Noting $$\frac{xE[|h_D|^2]}{\sigma_D^2 + yE[|g_C|^2]} = \frac{x/\eta_1}{\sigma_D^2 + y/\eta_2},$$

P4 can be solved using the proposed algorithm for perfect CSI scenario in closed form. The steps to obtain the optimal powers are summarized in Algorithm 2. Let (x*,y*) denote the solution of P4. Substituting (x*,y*) into the objective of P2, results in $R(x^*,y^*) \leq R^\circ$. In order to study the performance degradation due to solving P4 instead of P2, an upper-bound is found on the performance of P2 in the following proposition.

Upper-Bound Analysis

Proposition 4

An upper-bound on the objective of P2 can be obtained by solving the problem:

$$P5: \max_{(x,y)} \log_2\left(1 + y\left(1 - \frac{K_1 x}{K_2 + x}\right)b\right) + \log_2\left(1 + G\frac{xE[|h_D|^2]}{\sigma_D^2 + yE[|g_C|^2]}\right),$$

subject to (52-55),
where $G = (1 + \sigma_D^2 \eta_2 / P_C^{max}) \exp(\sigma_D^2 \eta_2 / P_C^{max}) E_1(\sigma_D^2 \eta_2 / P_C^{max}) > 1$. Note that $G \to 1$ as $P_C^{max} \to 0$. It can be shown using the following inequalities [1]:

$$\frac{1}{2}\ln\left(1 + \frac{2}{t}\right) < \exp(t)E_1(t) < \ln\left(1 + \frac{1}{t}\right) \text{ for all } t > 0 \quad (65)$$

Two random variables $X \triangleq xE[|h_D|^2]$ and $Y \triangleq \sigma_D^2 + yE[|g_C|^2]$ are considered for notation simplicity.

First, it is shown that the following inequality holds:

$$\frac{E[X]}{E[Y]} \leq E\left[\frac{X}{Y}\right] = \frac{E[X]}{E[Y]}\left(1 + \frac{\sigma^2 \eta_2}{2}\right)\exp\left(\frac{\sigma^2 \eta_2}{y}\right)E_1\left(\frac{\sigma^2 \eta_2}{y}\right). \quad (66)$$

Note that X and Y are independent random variables. Hence:

$$E\left[\frac{X}{Y}\right] = E[X]E\left[\frac{1}{Y}\right] \geq \frac{E[X]}{E[Y]} \quad (67)$$

since f(y)=1/(y) is a convex function.

Now, it is shown that $\varphi(t) = (1+t)\exp(t)E_1(t)$ is a strictly decreasing function of t. The continued fraction expansion of $E_1(t)$ is given by [1]:

$$\exp(t)E_1(t) = \cfrac{1}{t + \cfrac{1}{1 + \cfrac{1}{t + \cdots}}}. \quad (68)$$

Ignoring high order terms in (Equation 68):

$$\exp(t)E_1(t) < \frac{t+1}{t(t+2)} \text{ for all } t. \tag{69}$$

Using the inequality (Equation 69) and taking the first order derivative of φ(t), results in:

$$\frac{d\varphi(t)}{dt} = (2+t)\exp(t)E_1(t) - 1 - \frac{1}{t} < 0. \tag{70}$$

Since φ(t) is a strictly decreasing function, the right hand side (66) is maximized by Substituting $y = P_C^{max}$, i.e., $$E\left[\frac{X}{Y}\right] < G\frac{E[X]}{E[Y]} \text{ for all}(x, y). \tag{71}$$

Finally, note that E[ log$_2$(1+X/Y)]≤log$_2$(1+E[X/Y]) for any given (x,y) due to Jensen's inequality. Hence, the optimal objective of P5 is always an upper-bound on the optimal objective P2.

FIGS. 7-16 depict graphs for various D2D pair 18/WD 16 pairings utilizing the principles of the present disclosure.

Figure 17:
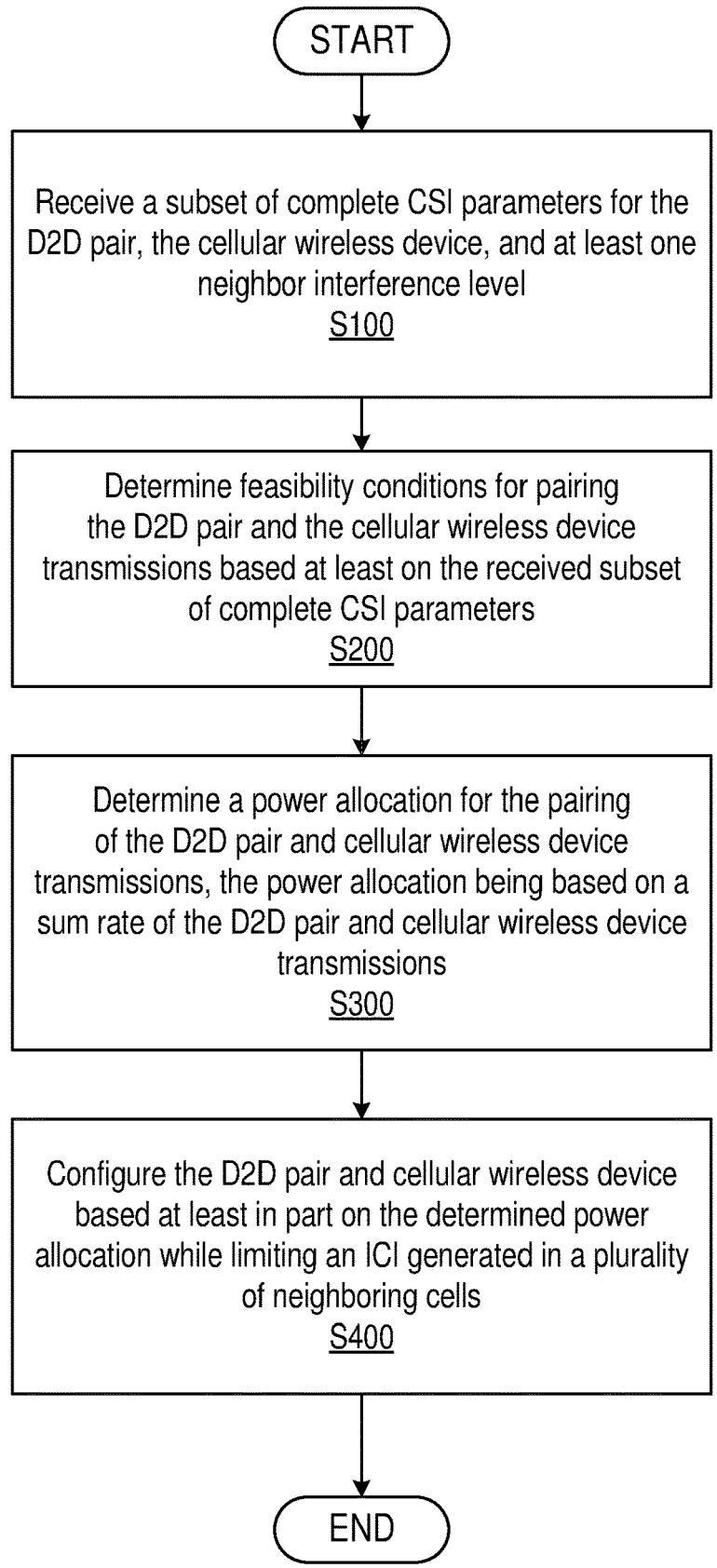
FIG. 17 is a flow diagram for configuring a D2D pair and cellular wireless device with imperfect CSI in accordance with the principles of the disclosure.

FIG. 17 a flow diagram for configuring a D2D pair 18 and cellular wireless device 16 with imperfect CSI in accordance with the principles of the disclosure. The cellular wireless device 16 is configured to have a direct link with a serving network device 12 of a network cell 14 in which the cellular wireless device 16 resides. The method includes receiving, by receiver 20, a subset of complete Channel State Information (CSI) parameters for the D2D pair 18, the cellular wireless device 16, and at least one neighbor interference level (Block S100), determining, by processor 26, feasibility conditions for pairing the D2D pair 18 and the cellular wireless device 16 transmissions based at least on the received subset of CSI parameters (Block S200), determining, via processor 26 in conjunction with power allocator 28, a power allocation for the pairing of the D2D pair 18 and cellular wireless device 16 transmissions, the power allocation being based on a sum rate of the D2D pair 18 and cellular wireless device 16 transmissions (Block S300), and configuring, by processor 26, the D2D pair 18 and cellular wireless device 16 based at least in part on the determined power allocation while limiting an inter-cell interference (ICI) generated in a plurality of neighboring cells (Block S400).

In one embodiment, the complete CSI parameters include a channel response between the D2D pair 18, a channel response between the cellular wireless device 16 and the network device 12, an interference channel between a D2D transmitter and the network device 12, an interference channel between the cellular wireless device 16 and a receiving device of the D2D pair 18, an ICI channel between the D2D pair 18 and a neighbor base station, and an ICI channel between the cellular wireless device and the neighbor base station. In one embodiment, processor 26 is further configured to determine a plurality of beam vectors at the D2D pair 18 and determining the power allocation for the pairing of the D2D pair 18 and cellular wireless device 16 transmissions based at least on the determined plurality of beam vectors.

In one embodiment, determining the power allocation for the pairing of the D2D pair 18 and cellular wireless device 16 transmissions includes determining a transmission power (Pc) for the cellular wireless device 16 and a transmission power (Pd) for the D2D pair 18. In one embodiment, determining the feasibility conditions for pairing the D2D pair 18 and the cellular wireless device 16 transmissions includes determining whether a predetermined criteria are met when sharing the same Physical Resource Blocks (PRBs) between the cellular wireless device 16 and the D2D pair 18. In one embodiment, the predetermined criteria include predefined Signal-to-Noise Ratio (SINR) thresholds for the D2D pair 18 and the cellular wireless device 16, and at least one predefined ICI channel threshold.

Figure 18:
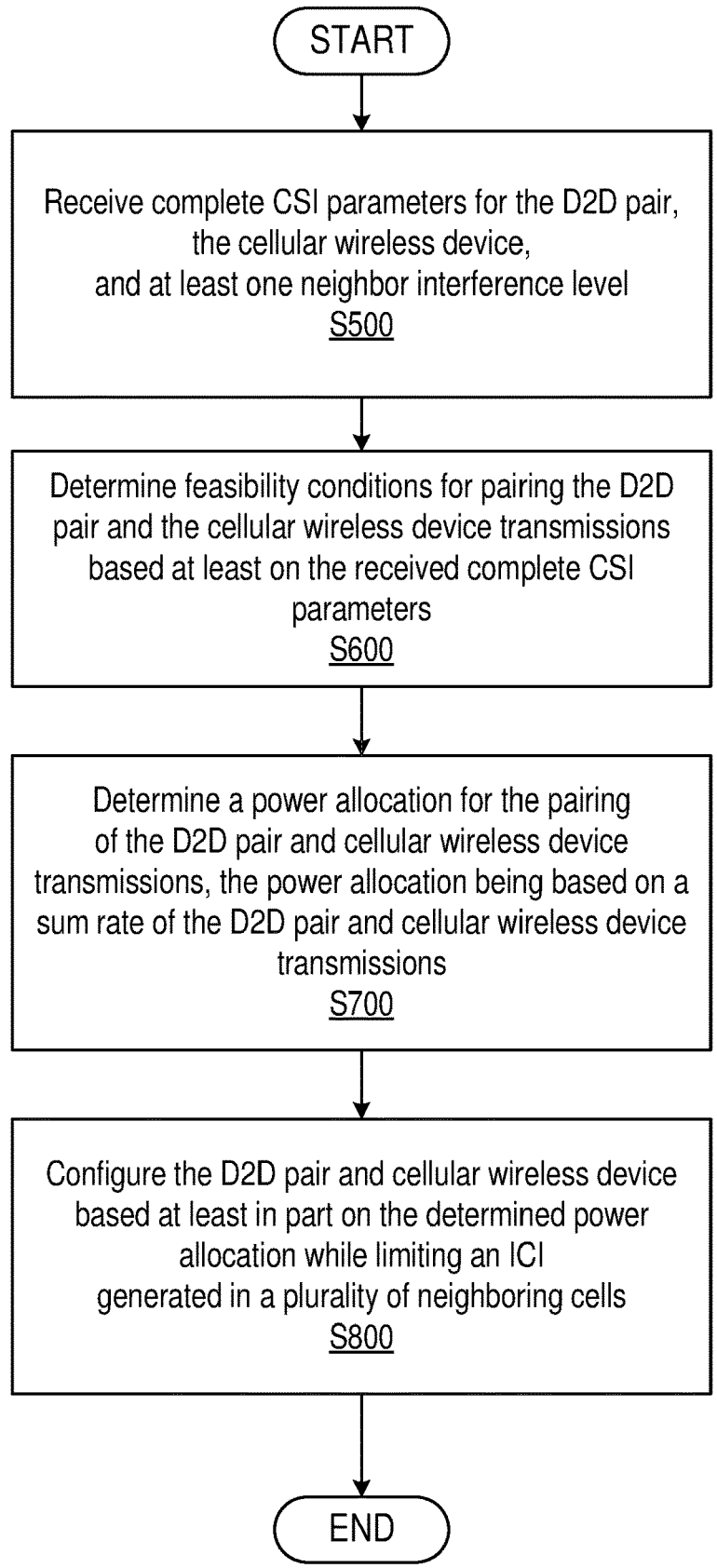
FIG. 18 is a flow diagram for configuring a D2D pair and cellular wireless device with perfect CSI in accordance with the principles of the disclosure.

FIG. 18 is a flow diagram for configuring a D2D pair 18 and cellular wireless device 16 with perfect CSI in accordance with the principles of the disclosure. The method of FIG. 18 is similar to the method of FIG. 17 except, in this embodiment, all CSI parameters are received (i.e., a "perfect" CSI scenario). The method shown in FIG. 18 may be used to configure a D2D pair 18 and a cellular wireless device 16, the cellular wireless device 16 configured to have a direct link with a serving network device 12 of a network cell 14 in which the cellular wireless device 16 resides. The method includes receiving, by receiver 20, complete CSI parameters for the D2D pair 18, the cellular wireless device 16, and at least one neighbor interference level (Block S500), determining, by processor 26, feasibility conditions for pairing the D2D pair 18 and the cellular wireless device 16 transmissions based at least on the received complete CSI parameters (Block S600), determining, by processor 26 in conjunction with power allocator 28, a power allocation for the pairing of the D2D pair 18 and cellular wireless device 16 transmissions, the power allocation being based on a sum rate of the D2D pair 18 and cellular wireless device 16 transmissions (Block S700), and configuring, by processor 26, the D2D pair 18 and cellular wireless device 16 based at least in part on the determined power allocation while limiting an ICI generated in a plurality of neighboring cells (Block S800).

In one embodiment, the complete CSI parameters include a channel response between the D2D pair 18, a channel response between the cellular wireless device 16 and the network device 12, an interference channel between a D2D transmitter and the network device 12, an interference channel between the cellular wireless device 16 and a receiving device of the D2D pair 18, an ICI channel between the D2D pair 18 and a neighbor base station, and an ICI channel between the cellular wireless device 16 and the neighbor base station.

In one embodiment, processor 26 is further configured to determine a plurality of beam vectors at the D2D pair 18, and determine, in conjunction with power allocator 28, the power allocation for the pairing of the D2D pair 18 and cellular wireless device 16 transmissions based at least on the determined plurality of beam vectors.

In one embodiment, determining the power allocation for the pairing of the D2D pair 18 and cellular wireless device 16 transmissions includes determining a transmission power (Pc) for the cellular wireless device 16 and a transmission power (Pd) for the D2D pair 18.

In one embodiment, determining the feasibility conditions for pairing the D2D pair 18 and the cellular wireless device 16 transmissions includes determining whether a predetermined criteria are met when sharing the same Physical Resource Blocks (PRBs) between the cellular wireless device 16 and the D2D pair 18. In one embodiment, the predetermined criteria include predefined Signal-to-Noise Ratio (SINR) thresholds for the D2D pair 18 and the cellular wireless device 16, and at least one predefined ICI channel threshold.

In one embodiment, the receiver 20 receives the complete CSI parameters (a "perfect" CSI scenario) and the processor 26 is configured to determine feasibility conditions for pairing the D2D pair 18 and the cellular wireless device 16 transmissions based at least on the complete CSI parameters.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A method performed by a network device for configuring a device-to-device, D2D, pair and a cellular wireless device, the cellular wireless device configured to have a direct link with a serving network device of a network cell in which the cellular wireless device resides, the method comprising:
   receiving a subset of complete Channel State Information, CSI, parameters for the D2D pair, the cellular wireless device, and at least one neighbor interference level;
   determining feasibility conditions for pairing the D2D pair and the cellular wireless device transmissions based at least on the received subset of CSI parameters, wherein determining the feasibility conditions includes determining whether a predetermined criteria is met when sharing the same Physical Resource Blocks, PRBs, between the cellular wireless device and the D2D pair, and wherein the predetermined criteria includes at least one predefined ICI channel threshold;
   determining a power allocation for the pairing of the D2D pair and cellular wireless device transmissions, the power allocation being based on a sum rate of the D2D pair and cellular wireless device transmissions; and
   configuring the D2D pair and cellular wireless device based at least in part on the determined power allocation while limiting an inter-cell interference, ICI, generated in a plurality of neighboring cells.

2. The method of claim 1, wherein the complete CSI parameters include:
- a channel response between the D2D pair;
- a channel response between the cellular wireless device and the network device;
- an interference channel between a D2D transmitter and the network device;
- an interference channel between the cellular wireless device and a receiving device of the D2D pair;
- an inter-cell interference, ICI, channel between the D2D pair and a neighbor base station; and
- an ICI channel between the cellular wireless device and the neighbor base station.

3. The method of claim 1, further comprising:
- determining a plurality of beam vectors at the D2D pair; and
- determining the power allocation for the pairing of the D2D pair and cellular wireless device transmissions based at least on the determined plurality of beam vectors.

4. The method of claim 1, wherein determining the power allocation for the pairing of the D2D pair and cellular wireless device transmissions includes determining a transmission power, Pc, for the cellular wireless device and a transmission power, Pd, for the D2D pair.

5. The method of claim 1, wherein the predetermined criteria include:
- predefined Signal-to-Noise Ratio, SINR, thresholds for the D2D pair and the cellular wireless device; and
- at least one predefined ICI channel threshold.

6. A network device for configuring a device-to-device, D2D, pair and a cellular wireless device, the cellular wireless device configured to have a direct link with a serving network device of a network cell in which the cellular wireless device resides, the network device comprising:
- a receiver configured to receive a subset of complete Channel State Information, CSI, parameters for the D2D pair, the cellular wireless device 464, and at least one neighbor interference level; and
- processing circuitry comprising:
  - a memory; and
  - a processor, the memory in communication with the processor, the memory having instructions that, when executed by the processor, configure the processor to:
    - determine feasibility conditions for pairing the D2D pair and the cellular wireless device transmissions based at least on the received subset of complete CSI parameters, wherein determining the feasibility conditions includes determining whether a predetermined criteria is met when sharing the same Physical Resource Blocks, PRBs, between the cellular wireless device and the D2D pair, and wherein the predetermined criteria includes at least one predefined ICI channel threshold;
    - determine a power allocation for the pairing of the D2D pair and cellular wireless device transmissions, the power allocation being based on a sum rate of the D2D pair and cellular wireless device transmissions; and
    - configure the D2D pair and cellular wireless device based at least in part on the determined power allocation while limiting an inter-cell interference, ICI, generated in a plurality of neighboring cells.

7. The network device of claim 6, wherein the complete CSI parameters include:
- a channel response between the D2D pair;
- a channel response between the cellular wireless device and the network device;
- an interference channel between a D2D transmitter and the network device;
- an interference channel between the cellular wireless device and a receiving device of the D2D pair;
- an inter-cell interference, ICI, channel between the D2D pair and a neighbor base station; and
- an ICI channel between the cellular wireless device and the neighbor base station.

8. The network device of claim 6, the processor further configured to:
- determine a plurality of beam vectors at the D2D pair; and
- determine the power allocation for the pairing of the D2D pair and cellular wireless device transmissions based at least on the determined plurality of beam vectors.

9. The network device of claim 6, wherein determining the power allocation for the pairing of the D2D pair and cellular wireless device transmissions includes determining a transmission power, Pc, for the cellular wireless device and a transmission power, Pd, for the D2D pair.

10. The network device of claim 6, wherein the predetermined criteria include:
- predefined Signal-to-Noise Ratio, SINR, thresholds for the D2D pair and the cellular wireless device.

11. A method performed by a network device for configuring a device-to-device, D2D, pair and a cellular wireless device, the cellular wireless device configured to have a direct link with a serving network device of a network cell in which the cellular wireless device resides, the method comprising:
- receiving complete Channel State Information, CSI, parameters for the D2D pair, the cellular wireless device, and at least one neighbor interference level;
- determining feasibility conditions for pairing the D2D pair and the cellular wireless device transmissions based at least on the received complete CSI parameters, wherein determining the feasibility conditions includes determining whether a predetermined criteria is met when sharing the same Physical Resource Blocks, PRBs, between the cellular wireless device and the D2D pair, and wherein the predetermined criteria includes at least one predefined ICI channel threshold;
- determining a power allocation for the pairing of the D2D pair and cellular wireless device transmissions, the power allocation being based on a sum rate of the D2D pair and cellular wireless device transmissions; and
- configuring the D2D pair and cellular wireless device based at least in part on the determined power allocation while limiting an inter-cell interference, ICI, generated in a plurality of neighboring cells.

12. The method for claim 11, wherein the complete CSI parameters include:
- a channel response between the D2D pair;
- a channel response between the cellular wireless device and the network device;
- an interference channel between a D2D transmitter and the network device;
- an interference channel between the cellular wireless device and a receiving device of the D2D pair;
- an inter-cell interference, ICI, channel between the D2D pair and a neighbor base station; and
- an ICI channel between the cellular wireless device and the neighbor base station.

13. The method of claim 11, further comprising:
determining a plurality of beam vectors at the D2D pair; and
determining the power allocation for the pairing of the D2D pair and cellular wireless device transmissions based at least on the determined plurality of beam vectors.

14. The method of claim 11, wherein determining the power allocation for the pairing of the D2D pair and cellular wireless device transmissions includes determining a transmission power, Pc, for the cellular wireless device and a transmission power, Pd, for the D2D pair.

15. The method of claim 11, wherein the predetermined criteria include:
predefined Signal-to-Noise Ratio, SINR, thresholds for the D2D pair and the cellular wireless device.

16. A network device for configuring a device-to-device, D2D, pair and a cellular wireless device, the cellular wireless device configured to have a direct link with a serving network device of a network cell in which the cellular wireless device resides, the network device comprising:
a receiver configured to receive complete Channel State Information, CSI, parameters for the D2D pair, the cellular wireless device, and at least one neighbor interference level; and
processing circuitry comprising:
a memory; and
a processor, the memory in communication with the processor, the memory having instructions that, when executed by the processor, configure the processor to:
determine feasibility conditions for pairing the D2D pair and the cellular wireless device transmissions based at least on the received complete CSI, parameters, wherein determining the feasibility conditions includes determining whether a predetermined criteria is met when sharing the same Physical Resource Blocks, PRBs, between the cellular wireless device and the D2D pair, and wherein the predetermined criteria includes at least one predefined ICI channel threshold;
determine a power allocation for the pairing of the D2D pair and cellular wireless device transmissions, the power allocation being based on a sum rate of the D2D pair and cellular wireless device transmissions; and
configure the D2D pair and cellular wireless device based at least in part on the determined power allocation while limiting an inter-cell interference, ICI, generated in a plurality of neighboring cells.

17. The network device of claim 16, wherein the complete CSI parameters include:
a channel response between the D2D pair;
a channel response between the cellular wireless device and the network device;
an interference channel between a D2D transmitter and the network device;
an interference channel between the cellular wireless device and a receiving device of the D2D pair;
an inter-cell interference, ICI, channel between the D2D pair and a neighbor base station; and
an ICI channel between the cellular wireless device and the neighbor base station.

18. The network device of claim 16, the processor further configured to:
determine a plurality of beam vectors at the D2D pair; and
determine the power allocation for the pairing of the D2D pair and cellular wireless device transmissions based at least on the determined plurality of beam vectors.

19. The network device of claim 16, wherein determining the power allocation for the pairing of the D2D pair and cellular wireless device transmissions includes determining a transmission power, Pc, for the cellular wireless device and a transmission power, Pd, for the D2D pair.

20. The network device of claim 16, wherein the predetermined criteria include:
predefined Signal-to-Noise Ratio, SINR, thresholds for the D2D pair and the cellular wireless device.

* * * * *